US012574075B2

(12) United States Patent
Prasad et al.

(10) Patent No.: US 12,574,075 B2
(45) Date of Patent: Mar. 10, 2026

(54) MULTI-LOBE BEAMS BASED ON RECONFIGURABLE INTELLIGENT SURFACE INDICATION

(71) Applicant: QUALCOMM Incorporated, San Diego, CA (US)

(72) Inventors: Narayan Prasad, Westfield, NJ (US); Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 18/314,400

(22) Filed: May 9, 2023

(65) Prior Publication Data

US 2024/0380441 A1 Nov. 14, 2024

(51) Int. Cl.
  *H04B 7/04* (2017.01)
  *H04B 7/155* (2006.01)
(52) U.S. Cl.
  CPC ......... *H04B 7/04026* (2023.05); *H04B 7/155* (2013.01)
(58) Field of Classification Search
  CPC . H04B 7/04013; H04B 7/04016; H04B 7/155
  See application file for complete search history.

(56) References Cited

U.S. PATENT DOCUMENTS

2024/0250742 A1* 7/2024 Prasad ............... H04B 7/04013

FOREIGN PATENT DOCUMENTS

WO WO-2022213000 A1 * 10/2022 ........... H04B 7/0617
WO WO-2023212146 A1 * 11/2023 ......... H04B 7/04013

OTHER PUBLICATIONS

International Search Report and Written Opinion—PCT/US2024/018314—ISA/EPO—Jun. 14, 2024.

* cited by examiner

*Primary Examiner* — Jianye Wu
(74) *Attorney, Agent, or Firm* — Holland & Hart LLP

(57) ABSTRACT

Methods, systems, and devices for wireless communications are described. The described techniques provide for a network entity to indicate a desired beamforming coverage scheme to a controller of a reconfigurable intelligent surface (RIS). The RIS controller may identify one or more realizable multi-lobe beamforming patterns in accordance with the desired beamforming coverage scheme, and may transmit multi-lobe beam information indicating the one or more realizable multi-lobe beamforming patterns to the network entity. In some cases, the RIS may indicate single-lobe beam information to the network entity, and the network entity may transmit one or more vectors to support generating the multi-lobe beam information. In some examples, based on the multi-lobe beam information, the network entity may indicate a multi-lobe beamforming pattern that the RIS is to use for relaying a multi-lobe reflect beam or a multi-lobe incident beam.

30 Claims, 16 Drawing Sheets

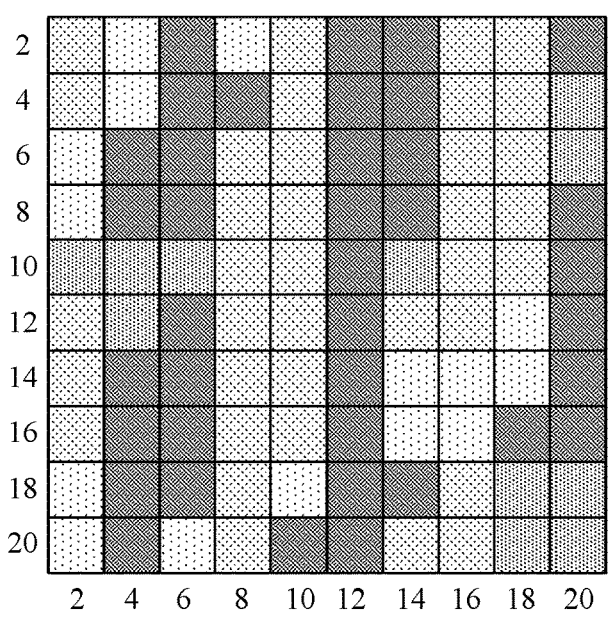
FIG. 3A     301
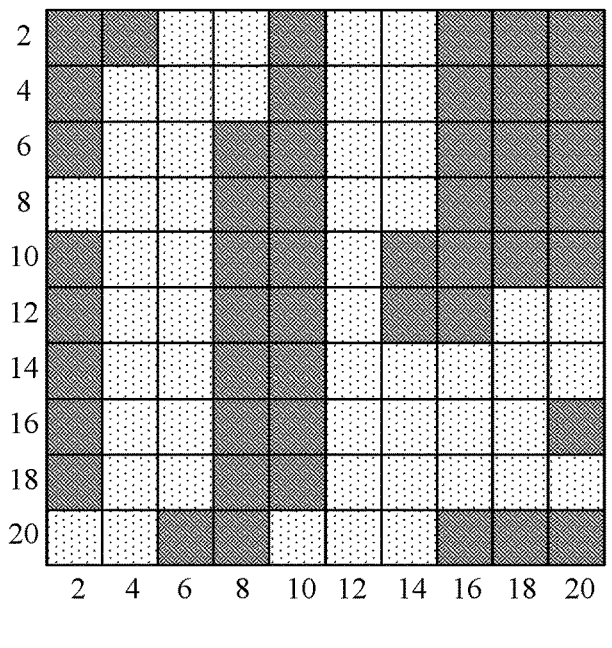
FIG. 3B     302
 Reflection Coefficient 305     Reflection Coefficient 310
Reflection Coefficient 315     Reflection Coefficient 320

130

105

115

Network
Entity

Transceiver

1010

Antenna

1015

Communications
Manager

1020

Memory

Code

1030

1025

1040

Processor

1035

1005

1000

Figure 15:
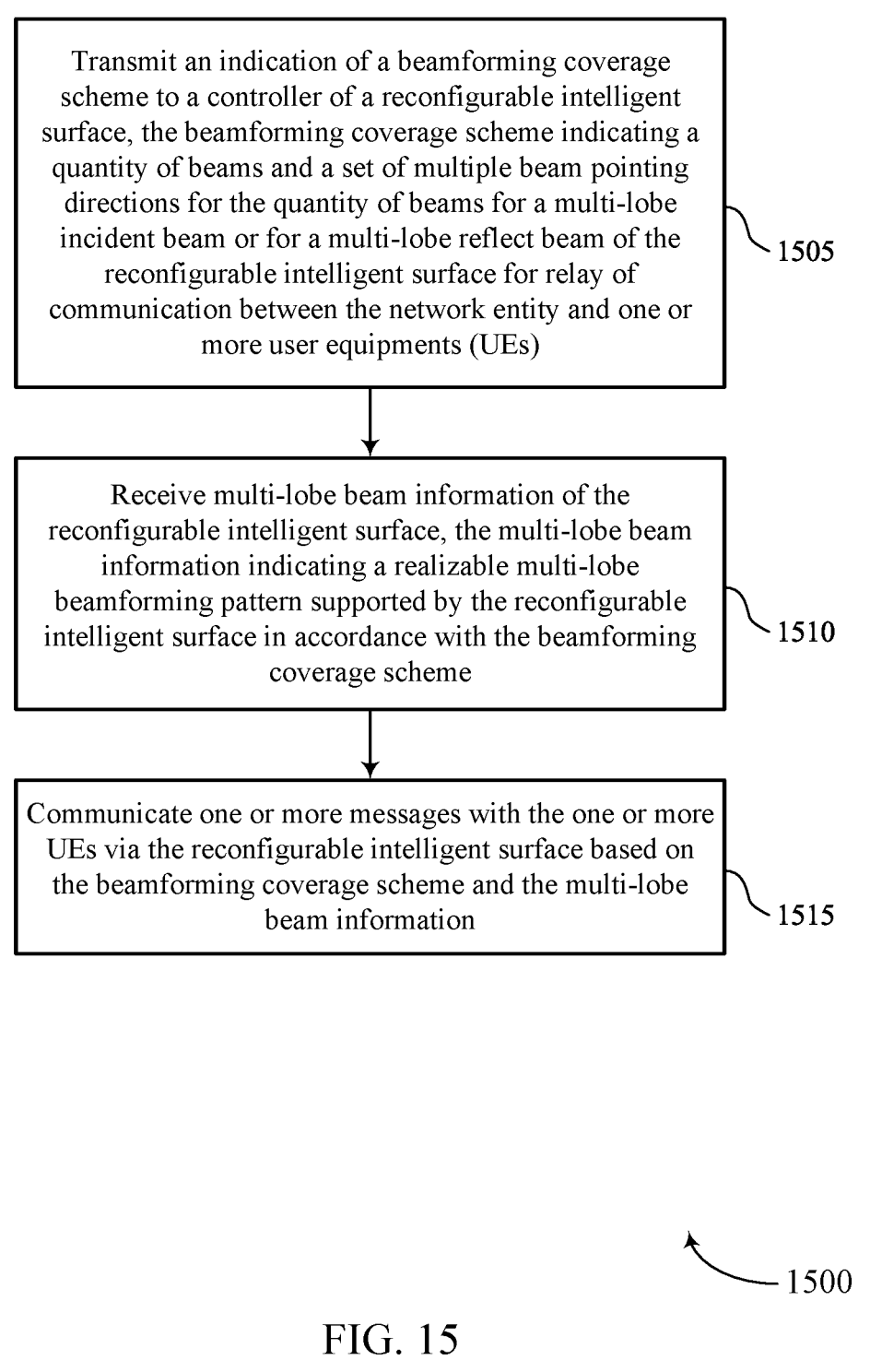

Transmit an indication of a beamforming coverage scheme to a controller of a reconfigurable intelligent surface, the beamforming coverage scheme indicating a quantity of beams and a set of multiple beam pointing directions for the quantity of beams for a multi-lobe incident beam or for a multi-lobe reflect beam of the reconfigurable intelligent surface for relay of communication between the network entity and one or more user equipments (UEs)

1505

Receive multi-lobe beam information of the reconfigurable intelligent surface, the multi-lobe beam information indicating a realizable multi-lobe beamforming pattern supported by the reconfigurable intelligent surface in accordance with the beamforming coverage scheme

1510

Communicate one or more messages with the one or more UEs via the reconfigurable intelligent surface based on the beamforming coverage scheme and the multi-lobe beam information

Figure 16:
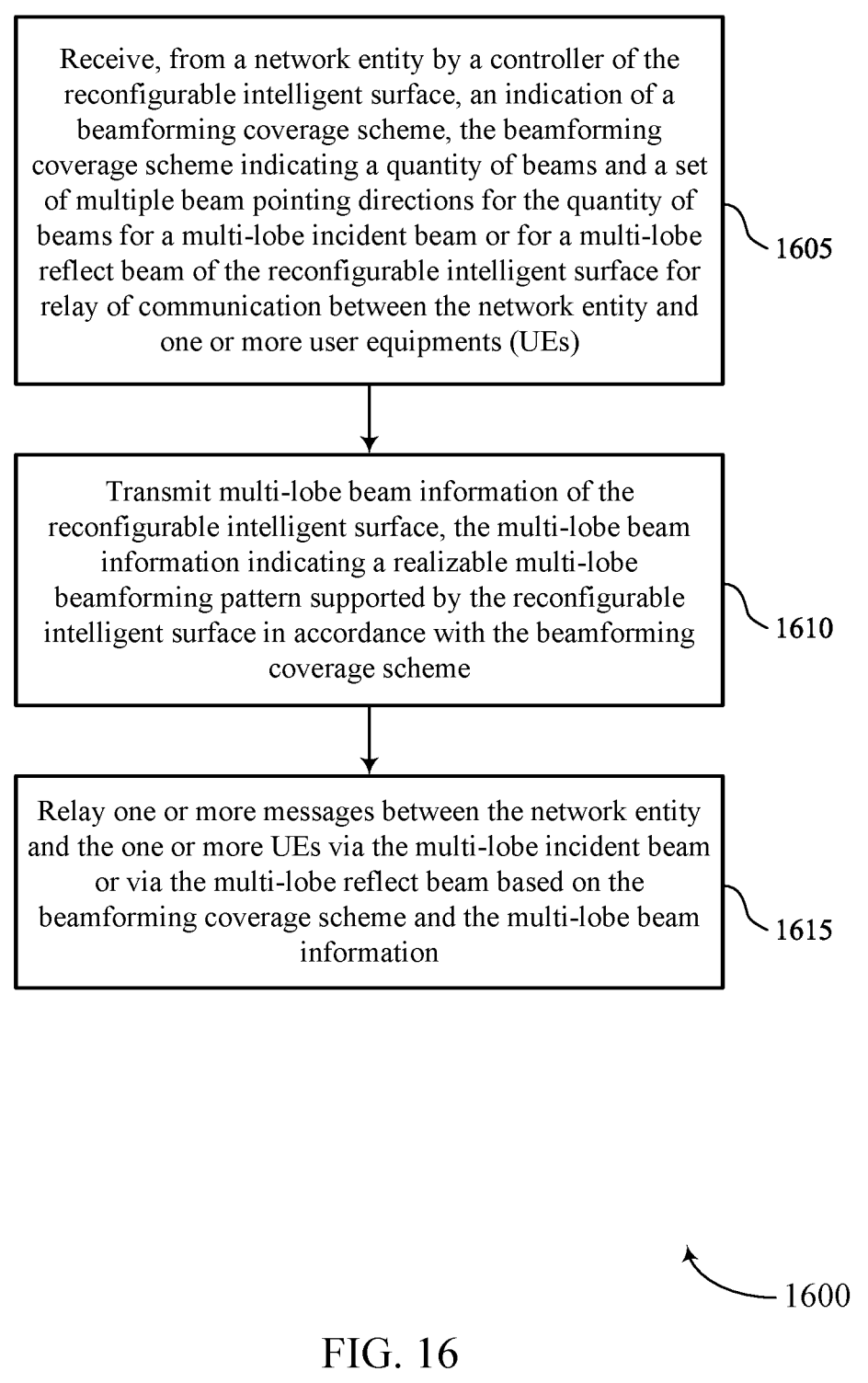

Receive, from a network entity by a controller of the reconfigurable intelligent surface, an indication of a beamforming coverage scheme, the beamforming coverage scheme indicating a quantity of beams and a set of multiple beam pointing directions for the quantity of beams for a multi-lobe incident beam or for a multi-lobe reflect beam of the reconfigurable intelligent surface for relay of communication between the network entity and one or more user equipments (UEs)

1605

Transmit multi-lobe beam information of the reconfigurable intelligent surface, the multi-lobe beam information indicating a realizable multi-lobe beamforming pattern supported by the reconfigurable intelligent surface in accordance with the beamforming coverage scheme

1610

Relay one or more messages between the network entity and the one or more UEs via the multi-lobe incident beam or via the multi-lobe reflect beam based on the beamforming coverage scheme and the multi-lobe beam information

MULTI-LOBE BEAMS BASED ON RECONFIGURABLE INTELLIGENT SURFACE INDICATION

FIELD OF TECHNOLOGY

The following relates to wireless communications, including multi-lobe beams based on reconfigurable intelligent surface indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some communications systems, a network entity may communicate with one or more UEs using beamformed communications. For example, the network entity may transmit data using one or more transmit beams of the network entity and may receive data using one or more receive beams of the network entity. In some cases, such beamformed communications may be performed using multi-lobe beams (e.g., including multiple main constituent beams).

SUMMARY

The described techniques relate to improved methods, systems, devices, and apparatuses that support multi-lobe beams based on reconfigurable intelligent surface (RIS) indication. For example, the described techniques provide for a network entity to indicate a beamforming coverage scheme (e.g., for communicating a multi-lobe beam) to a controller of the RIS. The RIS may identify one or more realizable multi-lobe beamforming patterns in accordance with the beamforming coverage scheme and may transmit multi-lobe beam information indicating the one or more realizable multi-lobe beamforming patterns to the network entity. In some cases, the RIS may indicate single-lobe beam information to the network entity, and the network entity may transmit one or more vectors (e.g., combining coefficient vectors or weighted priority vectors) to support generating the multi-lobe beam information. In some examples, based on the multi-lobe beam information, the network entity may indicate a multi-lobe beamforming pattern that the RIS is to use for relaying a multi-lobe reflect beam or a multi-lobe incident beam.

A method for wireless communication at a network entity is described. The method may include transmitting an indication of a beamforming coverage scheme to a controller of a RIS, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more user equipments (UEs), receiving multi-lobe beam information of the RIS, the multi-lobe beam information indicating a realizable multi-lobe beamforming pattern supported by the RIS in accordance with the beamforming coverage scheme, and communicating one or more messages with the one or more UEs via the RIS based on the beamforming coverage scheme and the multi-lobe beam information.

An apparatus for wireless communication at a network entity is described. The apparatus may include a processor, memory coupled with the processor, and instructions stored in the memory. The instructions may be executable by the processor to cause the apparatus to transmit an indication of a beamforming coverage scheme to a controller of a RIS, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs, receive multi-lobe beam information of the RIS, the multi-lobe beam information indicating a realizable multi-lobe beamforming pattern supported by the RIS in accordance with the beamforming coverage scheme, and communicate one or more messages with the one or more UEs via the RIS based on the beamforming coverage scheme and the multi-lobe beam information.

Another apparatus for wireless communication at a network entity is described. The apparatus may include means for transmitting an indication of a beamforming coverage scheme to a controller of a RIS, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs, means for receiving multi-lobe beam information of the RIS, the multi-lobe beam information indicating a realizable multi-lobe beamforming pattern supported by the RIS in accordance with the beamforming coverage scheme, and means for communicating one or more messages with the one or more UEs via the RIS based on the beamforming coverage scheme and the multi-lobe beam information.

A non-transitory computer-readable medium storing code for wireless communication at a network entity is described. The code may include instructions executable by a processor to transmit an indication of a beamforming coverage scheme to a controller of a RIS, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs, receive multi-lobe beam information of the RIS, the multi-lobe beam information indicating a realizable multi-lobe beamforming pattern supported by the RIS in accordance with the beamforming coverage scheme, and communicate one or more messages with the one or more UEs via the RIS based on the beamforming coverage scheme and the multi-lobe beam information.

Some examples of the method, apparatuses, and non-transitory computer-readable medium described herein may further include operations, features, means, or instructions for receiving a control message indicating a single-lobe beamforming codebook supported by the RIS and one or more beams that the RIS may be capable of simultaneously creating from the single-lobe beamforming codebook, where the indication of the beamforming coverage scheme may be transmitted in response to receiving the control message.

In some examples of the method, apparatuses, and non-transitory computer-readable medium described herein, transmitting the indication of the beamforming coverage scheme may include operations, features, means, or instructions for transmitting the indication of the beamforming coverage scheme that identifies a set of multiple beam indexes from the single-lobe beamforming codebook.

Some examples of the method, apparatuses, and non-transitory computer-readable medium described herein may further include operations, features, means, or instructions for receiving a control message indicating a single-lobe beamforming codebook, a multi-lobe beamforming codebook, and a quasi-colocation correspondence between one or more beams of the single-lobe beamforming codebook and one or more multi-lobe beam patterns of the multi-lobe beamforming codebook, where the indication of the beamforming coverage scheme identifies one or more beams from the single-lobe beamforming codebook or one or more multi-lobe beam patterns of the multi-lobe beamforming codebook based on the control message and the quasi-colocation correspondence.

In some examples of the method, apparatuses, and non-transitory computer-readable medium described herein, transmitting the indication of the beamforming coverage scheme may include operations, features, means, or instructions for transmitting the indication including an incident signal direction between the network entity and the RIS, a distance between the network entity and the RIS, a range of reflect beam pointing angles associated with the set of multiple beam pointing directions, one or more reflect beam pointing angles associated with the one or more UEs, one or more distance ranges associated with the one or more UEs, or any combination thereof.

In some examples of the method, apparatuses, and non-transitory computer-readable medium described herein, receiving the multi-lobe beam information may include operations, features, means, or instructions for receiving the multi-lobe beam information indicating one or more attributes of one or more beams associated with the realizable multi-lobe beamforming pattern, the one or more attributes including respective pointing angles associated with the one or more beams, respective beamwidths associated with the one or more beams, respective first gain values associated with the one or more beams, a second gain value associated with the one or more beams, reciprocity information associated with the one or more beams, or any combination thereof.

In some examples of the method, apparatuses, and non-transitory computer-readable medium described herein, receiving the multi-lobe beam information may include operations, features, means, or instructions for receiving a table indicating one or more multi-lobe beamforming patterns, where the one or more multi-lobe beamforming patterns include at least the realizable multi-lobe beamforming pattern and transmitting a request to use the realizable multi-lobe beamforming pattern, where communicating the one or more messages may be based on transmitting the request.

Some examples of the method, apparatuses, and non-transitory computer-readable medium described herein may further include operations, features, means, or instructions for receiving single-lobe beam information of the RIS based on transmitting the indication, the single-lobe beam information indicating one or more realizable single-lobe beamforming patterns supported by the RIS and transmitting an indication of a set of multiple vectors for generating one or more multi-lobe beamforming patterns, where receiving the multi-lobe beam information may be based on transmitting the set of multiple vectors.

Some examples of the method, apparatuses, and non-transitory computer-readable medium described herein may further include operations, features, means, or instructions for receiving capability information of the RIS, the capability information indicating a reflection coefficient alphabet associated with the RIS, element control information for the RIS, or both and transmitting an indication of one or more combining coefficients for combining two or more of the set of multiple vectors in accordance with the reflection coefficient alphabet.

In some examples of the method, apparatuses, and non-transitory computer-readable medium described herein, the reflection coefficient alphabet may be a binary alphabet or a quaternary alphabet.

In some examples of the method, apparatuses, and non-transitory computer-readable medium described herein, transmitting the one or more vectors may include operations, features, means, or instructions for transmitting an indication of one or more first vectors identifying a first priority associated with respective realizable single-lobe beamforming patterns of the one or more realizable single-lobe beamforming patterns, receiving first multi-lobe beamforming information of the RIS based on the one or more first vectors, transmitting an indication of one or more second vectors identifying a second priority associated with the respective realizable single-lobe beamforming patterns based on the first multi-lobe beamforming information failing to satisfy one or more conditions, and receiving second multi-lobe beamforming information of the RIS based on the one or more second vectors.

In some examples of the method, apparatuses, and non-transitory computer-readable medium described herein, each beam associated with the multi-lobe incident beam or the multi-lobe reflect beam may be associated with at least one UE of the one or more UEs.

A method for wireless communications at a RIS is described. The method may include receiving, from a network entity by a controller of the RIS, an indication of a beamforming coverage scheme, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs, transmitting multi-lobe beam information of the RIS, the multi-lobe beam information indicating a realizable multi-lobe beamforming pattern supported by the RIS in accordance with the beamforming coverage scheme, and relaying one or more messages between the network entity and the one or more UEs via the multi-lobe incident beam or via the multi-lobe reflect beam based on the beamforming coverage scheme and the multi-lobe beam information.

An apparatus for wireless communications at a RIS is described. The apparatus may include a processor, memory coupled with the processor, and instructions stored in the memory. The instructions may be executable by the processor to cause the apparatus to receive, from a network entity by a controller of the RIS, an indication of a beamforming coverage scheme, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs, transmit multi-lobe beam information of the RIS, the multi-lobe beam information indicating a realizable multi-lobe beamforming pattern supported by the RIS in accordance with the beamforming coverage scheme, and relay one or more messages between the network entity and the one or more UEs via the multi-lobe incident beam or via the multi-lobe reflect beam based on the beamforming coverage scheme and the multi-lobe beam information.

Another apparatus for wireless communications at a RIS is described. The apparatus may include means for receiving, from a network entity by a controller of the RIS, an indication of a beamforming coverage scheme, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs, means for transmitting multi-lobe beam information of the RIS, the multi-lobe beam information indicating a realizable multi-lobe beamforming pattern supported by the RIS in accordance with the beamforming coverage scheme, and means for relaying one or more messages between the network entity and the one or more UEs via the multi-lobe incident beam or via the multi-lobe reflect beam based on the beamforming coverage scheme and the multi-lobe beam information.

A non-transitory computer-readable medium storing code for wireless communications at a RIS is described. The code may include instructions executable by a processor to receive, from a network entity by a controller of the RIS, an indication of a beamforming coverage scheme, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs, transmit multi-lobe beam information of the RIS, the multi-lobe beam information indicating a realizable multi-lobe beamforming pattern supported by the RIS in accordance with the beamforming coverage scheme, and relay one or more messages between the network entity and the one or more UEs via the multi-lobe incident beam or via the multi-lobe reflect beam based on the beamforming coverage scheme and the multi-lobe beam information.

Some examples of the method, apparatuses, and non-transitory computer-readable medium described herein may further include operations, features, means, or instructions for transmitting a control message indicating a single-lobe beamforming codebook supported by the RIS and one or more beams that the RIS may be capable of simultaneously creating from the single-lobe beamforming codebook, where the indication of the beamforming coverage scheme may be received in response to transmitting the control message.

In some examples of the method, apparatuses, and non-transitory computer-readable medium described herein, receiving the indication of the beamforming coverage scheme may include operations, features, means, or instructions for receiving the indication of the beamforming coverage scheme that identifies a set of multiple beam indexes from the single-lobe beamforming codebook.

Some examples of the method, apparatuses, and non-transitory computer-readable medium described herein may further include operations, features, means, or instructions for transmitting a control message indicating a single-lobe beamforming codebook, a multi-lobe beamforming codebook, and a quasi-colocation correspondence between one or more beams of the single-lobe beamforming codebook and one or more multi-lobe beam patterns of the multi-lobe beamforming codebook, where the indication of the beamforming coverage scheme identifies one or more beams from the single-lobe beamforming codebook or one or more multi-lobe beam patterns of the multi-lobe beamforming codebook based on the control message and the quasi-colocation correspondence.

In some examples of the method, apparatuses, and non-transitory computer-readable medium described herein, receiving the indication of the beamforming coverage scheme may include operations, features, means, or instructions for receiving the indication including an incident signal direction between the network entity and the RIS, a distance between the network entity and the RIS, a range of reflect beam pointing angles associated with the set of multiple beam pointing directions, one or more reflect beam pointing angles associated with the one or more UEs, one or more distance ranges associated with the one or more UEs, or any combination thereof.

In some examples of the method, apparatuses, and non-transitory computer-readable medium described herein, transmitting the multi-lobe beam information may include operations, features, means, or instructions for transmitting the multi-lobe beam information indicating one or more attributes of one or more beams associated with the realizable multi-lobe beamforming pattern, the one or more attributes including respective pointing angles associated with the one or more beams, respective beamwidths associated with the one or more beams, respective first gain values associated with the one or more beams, a second gain value associated with the one or more beams, reciprocity information associated with the one or more beams, or any combination thereof.

In some examples of the method, apparatuses, and non-transitory computer-readable medium described herein, transmitting the multi-lobe beam information may include operations, features, means, or instructions for transmitting a table indicating one or more multi-lobe beamforming patterns, where the one or more multi-lobe beamforming patterns include at least the realizable multi-lobe beamforming pattern and receiving a request to use the realizable multi-lobe beamforming pattern, where relaying the one or more messages may be based on transmitting the request.

Some examples of the method, apparatuses, and non-transitory computer-readable medium described herein may further include operations, features, means, or instructions for transmitting single-lobe beam information of the RIS based on receiving the indication, the single-lobe beam information indicating one or more realizable single-lobe beamforming patterns supported by the RIS and receiving an indication of a set of multiple vectors for generating one or more multi-lobe beamforming patterns, where transmitting the multi-lobe beam information may be based on receiving the set of multiple vectors.

Some examples of the method, apparatuses, and non-transitory computer-readable medium described herein may further include operations, features, means, or instructions for transmitting capability information of the RIS, the capability information indicating a reflection coefficient alphabet associated with the RIS, element control information for the RIS, or both and receiving an indication of one or more combining coefficients for combining two or more of the set of multiple vectors in accordance with the reflection coefficient alphabet.

In some examples of the method, apparatuses, and non-transitory computer-readable medium described herein, the reflection coefficient alphabet may be a binary alphabet or a quaternary alphabet.

In some examples of the method, apparatuses, and non-transitory computer-readable medium described herein, receiving the indication of the set of multiple vectors may include operations, features, means, or instructions for receiving an indication of one or more first vectors identifying a first priority associated with respective realizable single-lobe beamforming patterns of the one or more realizable single-lobe beamforming patterns, transmitting first multi-lobe beamforming information of the RIS based on the one or more first vectors, receiving an indication of one or more second vectors identifying a second priority associated with the respective realizable single-lobe beamforming patterns based on the first multi-lobe beamforming information failing to satisfy one or more conditions, and transmitting second multi-lobe beamforming information of the RIS based on the one or more second vectors.

In some examples of the method, apparatuses, and non-transitory computer-readable medium described herein, each beam associated with the multi-lobe incident beam or the multi-lobe reflect beam may be associated with at least one UE of the one or more UEs.

BRIEF DESCRIPTION OF THE DRAWINGS

FIGS. 3A and 3B illustrate examples of RIS configurations that support multi-lobe beams based on RIS indication in accordance with one or more aspects of the present disclosure.

FIGS. 15 and 16 illustrate flowcharts showing methods that support multi-lobe beams based on RIS indication in accordance with one or more aspects of the present disclosure.

DETAILED DESCRIPTION

Figure 1:
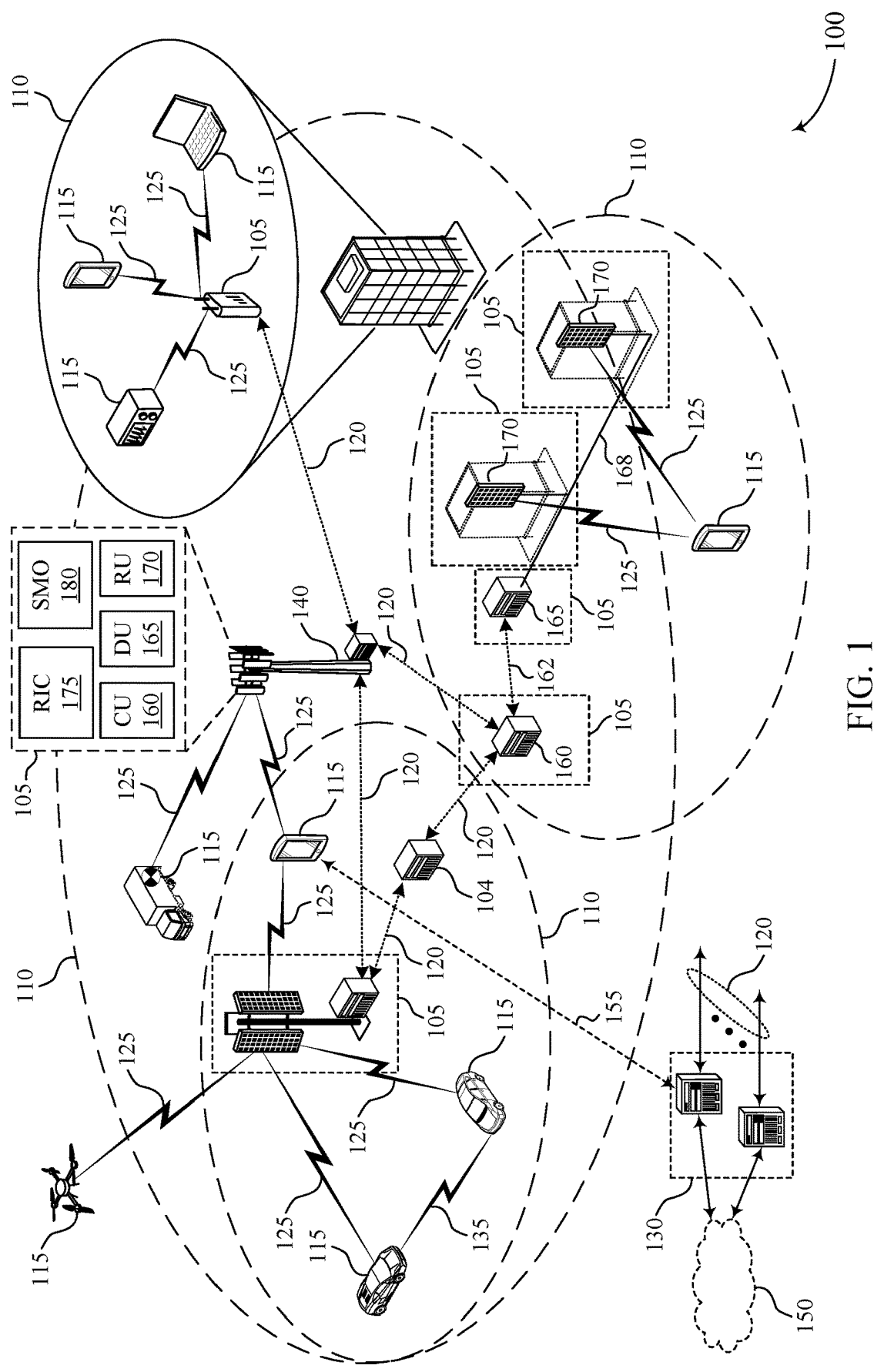
FIG. 1 illustrates an example of a wireless communications system that supports multi-lobe beams based on reconfigurable intelligent surface (RIS) indication in accordance with one or more aspects of the present disclosure.

A network entity may communicate with one or more user equipments (UEs) using beamformed communications. For example, the network entity may use a transmit beam to transmit data to the UEs and may use a receive beam to receive data from the UEs. In some examples, the network entity may communicate data with multiple UEs using multi-lobe beams. Such multi-lobe beams may include multiple beams that are each associated with data for one or more of the UEs. In some cases, a reconfigurable intelligent surface (RIS) may relay beamformed communications between the network entity and the UEs, which may improve a reliability of the communications (e.g., when an obstruction disrupts a direct path between the network entity and the UEs). To support relaying multi-lobe beams, the network entity may identify capabilities of the RIS, such as multi-lobe beam patterns realizable by the RIS. However, communicating such information may disclose secure information associated with the RIS (e.g., a P-type layer, Intrinsic layer and N-type layer (PIN) diode based implementation, a varactor diode based implementation, or unit-cell details), a configuration of the RIS may be relatively inflexible (e.g., unable to tailor multi-lobe beams based on user or traffic priorities), or both.

To support a network entity identifying realizable multi-lobe beamforming patterns for a RIS and configuring compatible multi-lobe beams, the network entity may indicate a beamforming coverage scheme (e.g., a desired, requested, or preferred scheme for communicating a multi-lobe beam) to a controller of the RIS. The RIS may identify one or more realizable multi-lobe beamforming patterns in accordance with the beamforming coverage scheme, and may transmit multi-lobe beam information indicating the one or more realizable multi-lobe beamforming patterns to the network entity. In some cases, the multi-lobe beam information may permit the network entity to direct signal energy towards one or more UEs via a multi-lobe beam, the one or more UEs to direct signal energy towards the network entity via a multi-lobe beam, or both, thereby enhancing the amount of signal energy received and increasing data throughput between the network entity and the one or more UEs. In some cases, the RIS may indicate single-lobe beam information to the network entity, and the network entity may transmit one or more vectors (e.g., combining coefficient vectors or weighted priority vectors) to support generating the multi-lobe beam information. For example, the network entity may perform one or more calculations determining the one or more vectors, and thus a portion of the computational workload may be performed at the network entity instead of by the RIS, to permit power savings at the RIS, use of a relatively simple RIS device (e.g., less capable RIS devices), or both. In some examples, based on the multi-lobe beam information, the network entity may indicate a multi-lobe beamforming pattern that the RIS is to use for relaying a multi-lobe reflect (or refract) beam (e.g., from the network entity to multiple UEs) or a multi-lobe incident beam (e.g., from multiple UEs to the network entity). Such techniques for indicating the multi-lobe beamforming pattern may allow the network entity to tailor one or more attributes, including beamwidth, pointing angle, range, or the like, of each beam of a multi-lobe beam to a respective UE of the multiple UEs.

Aspects of the disclosure are initially described in the context of wireless communications systems. Aspects of the disclosure are further illustrated by and described with reference to RIS configurations and process flows. Aspects of the disclosure are further illustrated by and described with reference to apparatus diagrams, system diagrams, and flow-charts that relate to multi-lobe beams based on RIS indication.

FIG. 1 illustrates an example of a wireless communications system 100 that supports multi-lobe beams based on RIS indication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multi-lobe beams based on RIS indication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report (e.g., via a control message or signaling) to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some systems, such as the wireless communications system 100, beamformed communications between devices (e.g., a network entity 105 and one or more UEs 115) may be relayed via a RIS (e.g., an array of passive and reconfigurable reflecting elements, which may boost coverage and spectral efficiency at a low deployment cost). For example, a direct path between a network entity 105 and a UE 115 may be disrupted by an obstruction, such as a physical structure or radio frequency interference, and beams may be communicated around the obstruction via the RIS. By relaying communications via the RIS, the network entity 105 may realize multiple anomalous reflections (e.g., each specified by a target incident direction and a reflected direction pair), which may support communications with one or more selected UEs 115 (e.g., by enhancing an end-to-end channel from the perspective of the selected UEs 115). In some cases, the network entity 105 may serve multiple UEs 115 via the RIS. As an example, such as when the RIS does not support frequency domain filtering (e.g., configured with a frequency non-selective pattern), the network entity 105 may communicate with the multiple UEs 115 according to TDM techniques (e.g., serving one UE 115 at a time), which may incur repeated RIS reconfiguration delay and may limit bandwidth usage for a relatively large available bandwidth (e.g., in frequency range 2 (FR2)). Additionally, or alternatively, if the network entity 105 is serving UEs 115 with relatively well separated angular directions, using a wide-beam RIS pattern may be associated with directivity loss along desired directions (e.g., a wide-beam reflect pattern in downlink may inject interference in directions without served UEs 115).

To support greater bandwidth usage for beamformed communications, the wireless devices may communicate multi-lobe beams (e.g., according to FDM techniques). For example, to perform downlink communications, the network entity 105 may transmit an incident beam to the RIS, and the RIS may relay a multi-lobe reflect (or refract) beam (e.g., including multiple beams each intended for one or more UEs 115) to the UEs 115. Additionally, or alternatively, to perform uplink communications, the UEs 115 may transmit a multi-lobe incident beam to the RIS, and the RIS may relay a reflect (or refract) beam (e.g., carrying data from each UE 115) to the network entity 105. In some cases, multi-lobe beams may be configured according to space division multiplexing (SDM) with subarray partitioning (e.g., one RIS subarray for each UE 115), which may reduce directivity along desired directions. Further, the multi-lobe beams may be configured with both amplitude control and phase control, which may increase a complexity of the system. Accordingly, the multi-lobe beams may instead be configured using phase-only control and using the full RIS array (e.g., to avoid reduced directivity and increased complexity).

In some cases, such as when performing downlink communications, information may be multicast to the UEs 115 (e.g., a video stream, common information, or the like) or may be unicast to the UEs 115 (e.g., each lobe of the multi-lobe reflect beam intended to serve one or more UEs 115 and carrying data of each served UE 115) by assigning orthogonal frequency resources (e.g., in 100 MHz chunks). In some other examples, such as when performing uplink communications, information may be unicast from the UEs 115 (e.g., each lobe of the multi-lobe incident beam associated with an incident signal from one or more UEs 115 with a higher gain) where each UE 115 may be assigned overlapping frequency domain resources (e.g., separated at the network entity 105 via non-orthogonal multiple access (NOMA)).

In some examples, a network entity 105 that controls a RIS for relaying multi-lobe beams may identify a set of multi-lobe beams that are realizable by the RIS. However, communicating such information may disclose secure information of the RIS (e.g., specific RIS implementation details), such as whether the RIS is PIN-diode based or varactor diode based, unit-cell details of the RIS, or the like. Additionally, or alternatively, the RIS configuration may be relatively inflexible (e.g., unable to tailor multi-lobe (composite) RIS beams based on UE 115 or traffic priorities). To support communicating multi-lobe beams via the RIS, the network entity 105 may indicate a beamforming coverage scheme (e.g., a desired, request, or preferred beamforming coverage scheme) to a controller of the RIS, and may receive multi-lobe beam information from the RIS according to the coverage scheme.

Figures 2A, 2B:
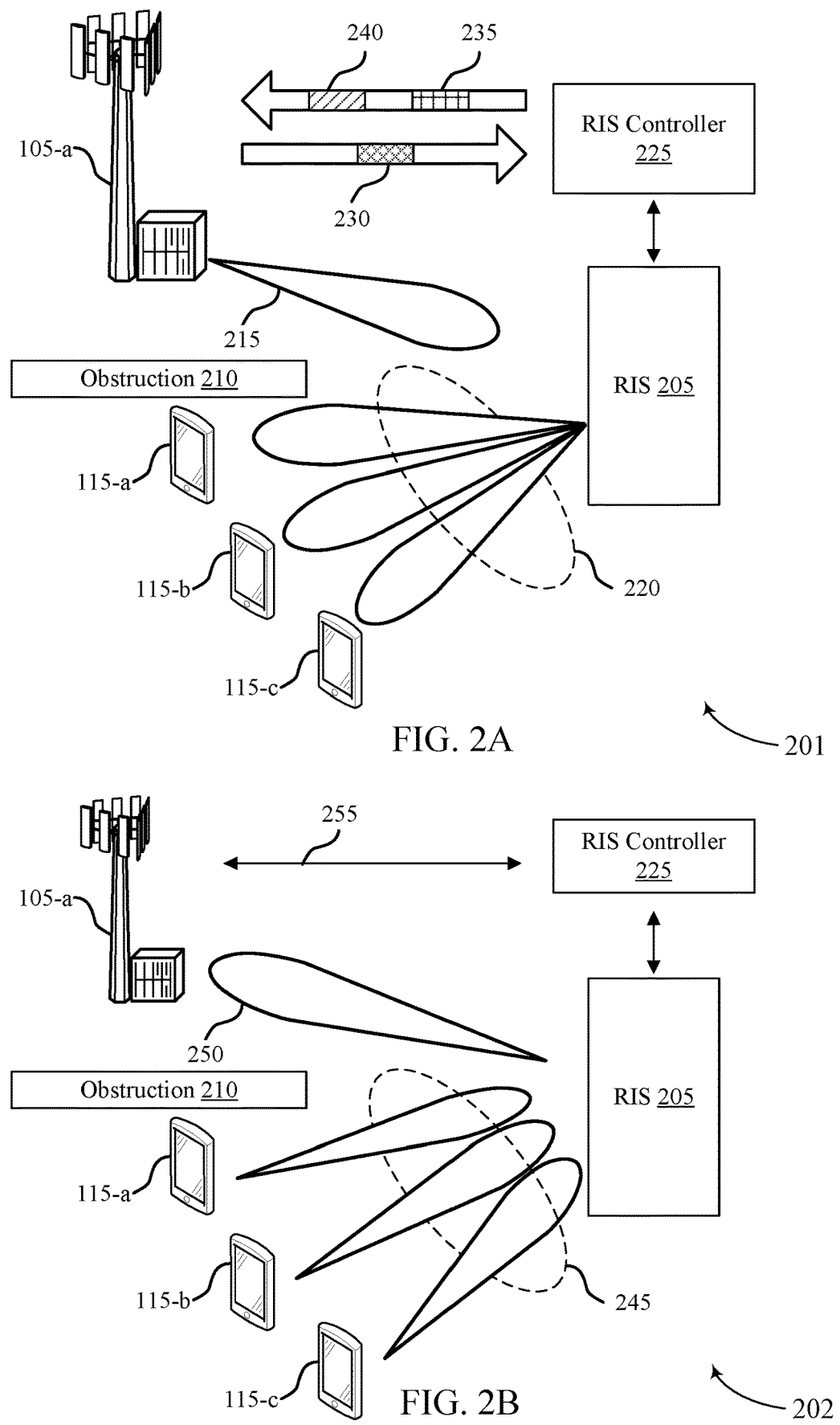
FIGS. 2A and 2B illustrate examples of wireless communications systems that support multi-lobe beams based on RIS indication in accordance with one or more aspects of the present disclosure.

FIGS. 2A and 2B illustrate examples of wireless communications systems 201 and 202, respectively, that support multi-lobe beams based on RIS indication in accordance with one or more aspects of the present disclosure. The wireless communications systems 201 and 202 may implement one or more aspects of the wireless communications system 100. For example, the wireless communications systems 201 and 202 may include a network entity 105-*a* and one or more UEs 115 (e.g., a UE 115-*a*, a UE 115-*b*, and a UE 115-*c*), which may be examples of corresponding devices described with reference to FIG. 1. In some cases, a RIS 205 (e.g., a RIS-FWD component for forwarding or reflecting signals) may support beamformed communications between the network entity 105-*a* and the UEs 115. For example, the RIS 205 may reflect one or more beams transmitted from the network entity 105-*a* or the UEs 115, which may avoid such beams colliding with an obstruction 210 (e.g., a physical structure, radio frequency interference, or the like).

FIG. 2A illustrates an example of the network entity 105-*a* communicating a downlink multi-lobe beam to the UEs 115 via the RIS 205. The network entity 105-*a* may transmit an incident beam 215 in a direction of the RIS 205, and the RIS 205 may relay a multi-lobe reflect beam 220 to the UE 115-*a*, the UE 115-*b*, and the UE 115-*c*. In some cases, each lobe of the multi-lobe reflect beam 220 may serve a single UE 115 or a group of UEs 115 within a small angular region, and each UE 115 within a same group may be served in a non-orthogonal fashion (e.g., treating messages of other UEs 115 as noise). For example, a first lobe of the multi-lobe reflect beam 220 may be directed to the UE 115-*a* (or a UE group including the UE 115-*a*), a second lobe of the multi-lobe reflect beam 220 may be directed to the UE 115-*b* (or a UE group including the UE 115-*b*), and a third lobe of the multi-lobe reflect beam 220 may be directed to the UE 115-*c* (or a UE group including the UE 115-*c*). In some cases, respective communications of UEs 115-*a*, 115-*b*, and 115-*c* may be frequency division multiplexed for transmission via different subbands of an available bandwidth. In some examples, each lobe of the multi-lobe reflect beam 220 may be aimed at one UE (or UE group) but may carry all served users data across frequency. In some cases, the multi-lobe reflect beam 220 may include one or more refract beams (e.g., beams redirected by passing through the RIS 205). For example, the RIS 205 may support an incident beam passing through the RIS 205, and may redirect (e.g., bend) the beam to serve one or more UEs 115 (e.g., located behind the RIS 205). In some cases, the RIS 205 may receive an incident beam and relay a multi-lobe refract beam to multiple UEs 115 (e.g., an incident signal passing through the RIS 205 and bending along multiple directions of the multiple UEs 115). In some examples, the multi-lobe reflect beam 220 may serve one or more UEs 115 that are in front of the RIS 205 (e.g., redirecting beams via reflection) and may serve one or more UEs 115 that are behind the RIS 205 (e.g., redirecting beams via refraction). It should be noted that techniques discussing a reflect beam may similarly apply to a refract beam and techniques discussing a refract beam may similarly apply to a reflect beam.

In some cases, the network entity 105-*a* may configure the RIS 205 according to a phase-only control and using the full array of the RIS 205 (e.g., to avoid loss due to subarray partitioning). For example, array elements of the RIS 205 may have various phases applied in order to direct the multi-lobe reflect beam 220. In some cases, the network entity 105-*a* may configure per RIS-element discrete alphabet control, as described further with reference to FIGS. 3A and 3B.

In some examples, the network entity 105-*a* may communicate with a RIS controller 225 (e.g., a RIS controller, a RIS-MT, or another network entity 105 associated with a RIS-FWD) via a control link and may exchange multi-lobe beam related capabilities to support the RIS 205 relaying the multi-lobe reflect beam 220 (e.g., without disclosing RIS-specific implementation details). For instance, the network entity 105-*a* may transmit, to the RIS controller 225, a beamforming coverage scheme 230 (e.g., an RRC message, a downlink control information (DCI) message, a MAC control element (MAC-CE), an uplink control information (UCI) message, or any other suitable control signaling), which may include one or more inputs associated with the multi-lobe reflect beam 220. Such inputs may include a quantity of beams for the multi-lobe reflect beam 220, a direction of the incident beam 215 (e.g., an incident signal direction from the network entity 105-*a* to the RIS 205), a distance between the network entity 105-*a* and the RIS 205, a range of reflected beam pointing angles (e.g., required beam pointing angles associated with the multi-lobe reflect beam 220), a set of angles associated with the UEs 115, a distance range corresponding to each angle of the set of angles (e.g., indicating an expected UE 115 reception distance along a corresponding angle), or any combination thereof.

In some cases, the RIS controller 225 may determine multi-lobe beam information 235 of the RIS 205 based on receiving the beamforming coverage scheme 230 and may transmit the multi-lobe beam information 235 to the network entity 105-*a* (e.g., via an RRC message, a DCI message, a MAC-CE, a UCI message, or any other suitable control signaling). The multi-lobe beam information 235 may indicate one or more realizable multi-lobe beamforming patterns that are supported by the RIS 205 in accordance with the beamforming coverage scheme. In some cases, the multi-lobe beam information 235 may indicate one or more attributes associated with multi-lobe beams corresponding to each of the one or more realizable multi-lobe beamforming patterns. For example, the one or more attributes for a multi-lobe beam may indicate respective pointing angles for each main lobe of the multi-lobe beam, respective beamwidths for each main lobe of the multi-lobe beam, respective peak gain information (e.g., values) for each main lobe of the multi-lobe beam, an indication of whether reciprocity holds for the multi-lobe beam (e.g., communicated via control signaling), or any combination thereof.

In some examples, the RIS controller 225 may transmit additional information about capabilities or supported multi-lobe beam configurations of the RIS 205 in a report 240. In some cases, the report 240 may be transmitted as an independent message (e.g., a control message prior to the multi-lobe beam information 325) or may be included as part of the multi-lobe beam information 235. The report 240 may be indicated by an operations, administration, and maintenance (OAM) controller, a RIS-MT of the RIS 205, or both. In some cases, the report 240 may indicate a basic single-lobe beamforming codebook and information about which beam combinations from the codebook the RIS 205 may simultaneously create. Additionally, or alternatively, the report 240 may indicate a basic single-lobe beamforming codebook and one or more multi-lobe beamforming codebooks, and may further include a (quasi) correspondence between one or more beams (e.g., codewords) of the single-lobe beamforming codebook and one or more main lobes of a multi-lobe beam pattern of the multi-lobe beamforming codebook. In some examples, the report 240 may indicate gain values for the main lobes, side lobes, or both, for single-lobe and multi-lobe beams. In some cases, network entity 105-*a* may indicate a multi-lobe configuration to be adopted by the RIS 205. For example, the network entity 105-*a* may indicate, to the RIS controller 225, a combination of two or more beam indices to be created simultaneously by the RIS 205 (e.g., indicating TCI states, SSB indices, or RIS configuration elements in at least one of the RIS configuration codebooks), an index to a multi-lobe beamforming codebook (e.g., associated with the multi-lobe beam configuration), or both. The indication may be included as part of the beamforming coverage scheme 230 or may be included in a separate message (e.g., a control message).

As an example, the report 240 may indicate that the RIS 205 may support N single-lobe configurations to forward N synchronization signal blocks (SSBs) (e.g., {SSB$_1$, SSB$_2$, . . . , SSB$_N$}). The report 240 may further indicate that the RIS 205 may support multi-lobe beamforming for one or more subsets of the single-lobe configurations (e.g., {(SSB$_1$, SSB$_2$), (SSB$_2$, SSB$_3$), . . . (SSB$_i$, SSB$_j$, SSB$_k$), . . . }). The network entity 105-*a* may indicate that the RIS 205 is to create a beam for a combination of directions (e.g., (SSB$_1$, SSB$_2$)) or may indicate that the RIS 205 is to create a beam for a combination of directions with suppressed energy towards another direction (e.g., (SSB$_1$, SSB$_2$) minus SSB$_3$).

In some cases, such as when the multi-lobe beam information 235 does not indicate pointing angle information, the pointing angles for the multi-lobe beam may be implied (e.g., via quasi-correspondence with single-lobe patterns) to be at least contained within the main lobes of corresponding single-lobe patterns (e.g., indicated by single-lobe pattern identifiers (IDs)) or may be inferred to be within a predetermined threshold of the pointing angles of the corresponding single-lobe patterns. Additionally, or alternatively, the one or more attributes may include a threshold value and a distance range associated with each main lobe of the multi-lobe beam, which may indicate the distance range along a direction over which a gain of a main lobe is within the threshold value of the peak gain of the main lobe. In some cases, the respective peak gain value for each main lobe of the multi-lobe beam may be indicated by a relative difference with respect to a common reference value. In some other cases, a single gain value associated with the multi-lobe beam may be included (e.g., as a relative difference with respect to the common reference value), which may imply that a peak gain value of each main lobe exceeds the single gain value.

In some examples, the multi-lobe beam information 235 may be indicated in tabular form (e.g., via an indication of a table communicated in a control message or signaling). Table 1 below includes an example of the multi-lobe beam information 235 in tabular form:

TABLE 1

| | Reflect Beam 1 | Reflect Beam 2 | Reflect . . . Beam Q |
|---|---|---|---|
| Reflect Beam 1 | — | Dual-Lobe (primacy to Beam 1) | . . . Dual-Lobe (primacy to Beam 1) |
| Reflect Beam 2 | Dual-Lobe (primacy to Beam 2) | — | . . . Dual-Lobe (primacy to Beam 2) |
| . . . | . . . | . . . | . . . . . . |
| Reflect Beam Q | Dual-Lobe (primacy to Beam Q) | Dual-Lobe (primacy to Beam Q) | . . . — |

In some cases, each entry included in Table 1 may include attributes for a dual-lobe pattern for two main lobes according to single-lobe patterns supported by the RIS 205 (e.g., Q single-lobe patterns). For example, attributes for an (m, n)$^{th}$ entry of Table 1 may indicate a first main lobe aligned to a single main-lobe pattern of reflect beam m and a second main lobe aligned to a single main-lobe pattern of reflect beam n. In some cases, alignment between two lobes may indicate that the lobes have a significant overlap in an angular domain, that the pointing angle or peak gain of one lobe is covered by the other lobe, or both.

As an example, an entry (2, 1) of Table 1 may include attributes of a first realizable dual-lobe pattern with two main lobes, which may be aligned to a single main-lobe pattern of reflect beam 2 and a single main-lobe pattern of reflect beam 1, respectively. In such an example, the first dual-lobe pattern may indicate a relatively higher gain along the direction of reflect beam 2 (e.g., primacy to beam 2) and the attributes of the first dual-lobe pattern may include a gain for each of the two main lobes with respect to a peak gain of the single main-lobe pattern of reflect beam 2, a reciprocity indication for the first dual-lobe pattern, or both.

Similarly, an entry (1, 2) of Table 1 may include attributes of a second realizable dual-lobe pattern with two main lobes, which may be aligned to a single main-lobe pattern of reflect beam 1 and a single main-lobe pattern of reflect beam 2. The second dual-lobe pattern may indicate a relatively higher gain along the direction of reflect beam 1 (e.g., primacy to beam 1) and the attributes of the second dual-lobe pattern may include a gain for each of the two main lobes with respect to a peak gain of the single main-lobe pattern of reflect beam 1, a reciprocity indication for the second dual-lobe pattern, or both. In some cases, a special value may be used for an entry to indicate that a dual-lobe pattern corresponding to the entry cannot be formed or realized.

The network entity 105-*a* may identify the one or more realizable multi-lobe beamforming patterns based on the multi-lobe beam information 235, and may transmit a request to select one of the realizable multi-lobe beamforming patterns for relaying the multi-lobe reflect beam 220.

It should be noted that the multi-lobe beam information may include attributes for multi-lobe patterns associated with any quantity of beams (e.g., three-lobe patterns, four-lobe patterns, and so on), and is not limited to the quantity of beams depicted in Table 1.

FIG. 2B illustrates an example of the network entity 105-*a* communicating an uplink multi-lobe beam with the UEs 115 via the RIS 205. The UE 115-*a*, the UE 115-*b*, and the UE 115-*c* may each transmit a beam in a direction of the RIS 205 to form a multi-lobe incident beam 245, and the RIS 205 may relay a reflect (or refract) beam 250 (e.g., carrying data from each UE 115 across frequency) to the network entity 105-*a*. In some cases, each lobe of the multi-lobe incident beam 245 may capture an incident signal from a single UE 115 or a group of UEs 115 within a small angular region (e.g., with higher gain). For example, a first lobe of the multi-lobe incident beam 245 may be transmitted from the UE 115-*a* (or a UE group including the UE 115-*a*), a second lobe of the multi-lobe incident beam 245 may be transmitted from the UE 115-*b* (or a UE group including the UE 115-*b*), and a third lobe of the multi-lobe incident beam 245 may be transmitted from the UE 115-*c* (or a UE group including the UE 115-*c*). The network entity 105-*a* may communicate with the RIS controller 225 via a control link 255, which may support communicating control messages as described with reference to FIG. 2A (e.g., the beamforming coverage scheme 230, the multi-lobe beam information 235, and the report 240, among other signaling). The network entity 105-*a* and the UEs 115 may communicate the multi-lobe incident beam via the RIS 205 using techniques similar to those described with reference to FIG. 2A. In some cases, respective communications of UEs 115-*a*, 115-*b*, and 115-*c* may be frequency division multiplexed for transmission via different subbands of an available bandwidth. In some examples, each lobe of the lobe of the multi-lobe incident beam 245 may capture incident signal from one UE (or UE group) with higher gain, and the reflect beam 250 may carry data from all UEs across frequency.

FIGS. 3A and 3B illustrate examples of RIS configurations 301 and 302, respectively, that support multi-lobe beams based on RIS indication in accordance with one or more aspects of the present disclosure. The RIS configurations 301 and 302 may be implemented by one or more aspects of the wireless communications systems 201 and 202. For example, the RIS configurations 301 and 302 may include an array of passive and reconfigurable reflecting elements for relaying beamformed communications between a network entity 105 and one or more UEs 115, which may be an example of the RIS 205 described with reference to FIGS. 2A and 2B. In some cases, the RIS configurations 301 and 302 may incorporate per RIS-element discrete alphabet control according to a quaternary alphabet or a binary alphabet, respectively.

FIG. 3A illustrates the RIS configuration 301, which may be an example of a RIS operating in accordance with a quaternary alphabet for reflection coefficients. In such a configuration, each element of the RIS array may be applied with a reflection coefficient 305, a reflection coefficient 310, a reflection coefficient 315, or a reflection coefficient 320, which may correspond to values of the quaternary-RIS alphabet (e.g., $\{\pm 1, \pm j\}$). As an example, the reflection coefficient 305 may correspond to a value of 1, the reflection coefficient 310 may correspond to a value of $-1$, the reflection coefficient 315 may correspond to a value of j, and the reflection coefficient 320 may correspond to a value of $-j$. It should be noted that the values corresponding to the reflection coefficients and the distribution of the reflection coefficients for the RIS array can be configured in a number of different ways, and is not limited to the configuration depicted in the RIS configuration 301.

In some cases, a multi-lobe RIS reflection coefficient pattern may be identified according to a scalable optimization algorithm. For example, the RIS may include a quantity of N RIS elements (e.g., N=400 for a 20×20 array of RIS elements), where a RIS operating according to a quaternary alphabet may be configured with up to $4^N$ different patterns. Thus, a brute-force search may be infeasible, and an alternating optimization based scalable design algorithm may be implemented (e.g., to determine which reflection coefficients to apply to RIS elements). As an example, the RIS configuration 301 may depict a 28 GHz, 20×20 quaternary RIS with 0.42 inter-element spacing and free space path-loss (FSPL). In such an example, each desired direction for a multi-lobe beam may have a relatively higher far-field gain performance (e.g., about 1 dB worse than unconstrained RIS in terms of worst-case desired direction gain (among the desired directions)).

FIG. 3B illustrates the RIS configuration 302, which may be an example of a RIS operating in accordance with a binary alphabet for reflection coefficients. In such a configuration, each element of the RIS array may be applied with a reflection coefficient 305 or a reflection coefficient 310, which may correspond to values of the binary-RIS alphabet (e.g., $\{\pm 1\}$). As an example, the reflection coefficient 305 may correspond to a value of 1 and the reflection coefficient 310 may correspond to a value of $-1$. It should be noted that the values corresponding to the reflection coefficients and the distribution of the reflection coefficients for the RIS array can be configured in a number of different ways, and is not limited to the configuration depicted in the RIS configuration 302.

In some cases, a multi-lobe RIS reflection coefficient pattern may be identified according to a scalable optimization algorithm. For example, the RIS may include a quantity of N RIS elements (e.g., N=400 for a 20×20 array of RIS elements), where a RIS operating according to a binary alphabet may be configured with up to $2^N$ different patterns. Thus, a brute-force search may be infeasible, and an alternating optimization based scalable design algorithm may be implemented (e.g., to determine which reflection coefficients to apply to RIS elements). As an example, the RIS configuration 302 may depict a 28 GHz, 20×20 binary RIS with $0.4\lambda$ inter-element spacing and free space path-loss (FSPL). In such an example, each desired direction for a multi-lobe beam may have a relatively higher far-field gain performance (e.g., about 2.33 dB worse than quaternary RIS in terms of worst-case desired direction gain (among the desired directions)).

Figure 4:
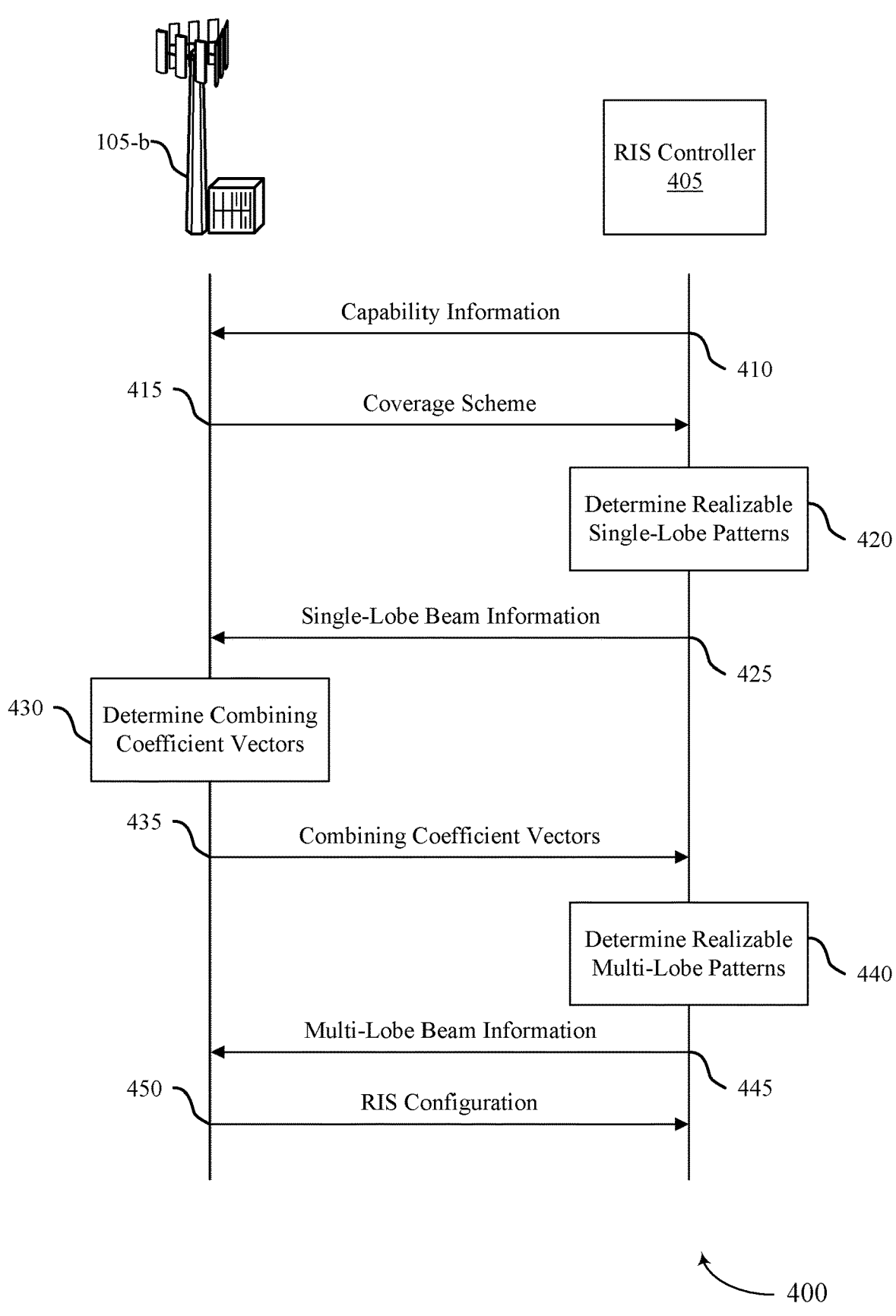
FIG. 4 illustrates an example of a process flow that supports multi-lobe beams based on RIS indication in accordance with one or more aspects of the present disclosure.

FIG. 4 illustrates an example of a process flow 400 that supports multi-lobe beams based on RIS indication in accordance with one or more aspects of the present disclosure. The process flow 400 may be implemented by one or more aspects of the wireless communications systems 201 and 202. For example, the process flow 400 may be an example of signaling between a network entity 105-b and a RIS controller 405, which may be examples of corresponding devices described with reference to FIGS. 2A and 2B. In some cases, the network entity 105-b may communicate with the RIS controller 405 to relay, via a RIS associated with the RIS controller 405, a multi-lobe beam between the network entity 105-b and one or more UEs 115. In some examples, the signaling between the network entity 105-b and the RIS controller 405 may be performed via a control link, and may include control messages such as RRC messages, DCI messages, MAC-CEs, UCI messages, or the like.

In some cases, the network entity 105-b may configure multi-lobe beams according to a linear combination based multi-lobe design (e.g., constructing multi-lobe patterns by using individually optimized single-lobe patterns), which may support identifying multi-lobe beam information of the RIS without specifying a multi-lobe codebook of the RIS. The linear combination based multi-lobe design may include obtaining a linear combination of individually optimized RIS single-lobe patterns, enforcing one or more RIS alphabet constraints, or both.

As an example, the RIS may support a first and a second single-lobe pattern, $\Gamma^{(1)}$ and $\Gamma^{(2)}$, respectively, and a quantizer, $Q(z)$, may enforce the RIS alphabet constraints on a scalar input, z. The network entity 105-b may compute a first function, $z(\alpha)$, where $\alpha$ may be a unit-magnitude coefficient (e.g., $\alpha$: $|\alpha|=1$), according to Equation 1 below:

$$z(\alpha) = \Gamma^{(1)} + \alpha\Gamma^{(2)} = [z_1, z_2, \ldots, z_N] \qquad (1)$$

The network entity 105-b may then determine a second function, $\Gamma(\alpha)$, according to Equation 2 below:

$$\Gamma(\alpha) = [\Gamma_1, \Gamma_2, \ldots, \Gamma_N] : \Gamma_i = Q(z_i) \forall_i \qquad (2)$$

The network entity 105-b may then compute a metric to use for a according to Equation 3 below:

$$\min\left\{\left|(\Gamma^{(1)})^H\Gamma(\alpha)\right|,\left|(\Gamma^{(2)})^H\Gamma(\alpha)\right|\right\} \quad (3)$$

In some cases, the network entity 105-*b* may select an α value with a highest metric (e.g., a best α). To support the linear combination based multi-lobe design, the network entity 105-*b* and the RIS controller 405 may exchange combining coefficients for multi-lobe beamforming according to the process flow 400. Alternative examples of the following may be implemented, where some processes are performed in a different order than described or are not performed. In some cases, processes may include additional features not mentioned below, or further processes may be added.

At 410, the RIS controller 405 may transmit, to the network entity 105-*b*, capability information of the RIS. In some cases, the capability information may indicate the reflection coefficient alphabet supported by the RIS (e.g., a binary alphabet, a quaternary alphabet, or the like), per-element control information for the RIS, per-group (e.g., a grouping of RIS elements) control information for the RIS, or a combination thereof.

At 415, the network entity 105-*b* may transmit, to the RIS controller 405, a coverage scheme (e.g., a desired, requested, or preferred beamforming coverage scheme), which may provide one or more inputs to the RIS controller 405 (or another network entity 105 associated with the RIS). In some cases, the one or more inputs may include an incident signal direction from the network entity 105-*b* and the RIS, a distance between the network entity 105-*b* and the RIS, a range of reflected angles for relaying a multi-lobe beam (e.g., a range of required reflected angles), or any combination thereof. Additionally, or alternatively, the one or more inputs may include a set of one or more angles corresponding to a set of one or more UEs 115 communicating with the network entity 105-*b* and a set of distance ranges for each angle of the one or more angles (e.g., indicating expected UE 115 distances along a corresponding angle).

At 420, the RIS controller 405 may determine one or more realizable single-lobe beamforming patterns supported by the RIS. For example, the RIS controller 405 may identify a set of single-lobe beams the RIS is capable of creating (e.g., a basic single-lobe codebook). In some cases, a single-lobe beamforming pattern for a single-lobe beam may indicate a pointing direction associated with the single-lobe beam and a relative gain associated with the single-lobe beam.

At 425, the RIS controller 405 may transmit, to the network entity 105-*b*, single-lobe beam information indicating the one or more realizable single-lobe beamforming patterns supported by the RIS. For example, the network entity 105-*b* may receive a single-lobe codebook associated with the RIS.

At 430, the network entity 105-*b* may determine a set of one or more combining coefficient vectors for one or more multi-lobe beamforming patterns based on receiving the single-lobe beam information. For example, the network entity 105-*b* may identify the realizable single-lobe beamforming patterns supported by the RIS, and may determine coefficients for combining various single-lobe beamforming patterns into one or more multi-lobe beamforming patterns. In some cases, the combining coefficient vector may be a complex scalar (e.g., with an amplitude and phase) for linearly combining a single-lobe beam.

At 435, the network entity 105-*b* may transmit, to the RIS controller 405, the combining coefficient vectors to support the RIS generating multi-lobe beams. In some cases, receiving the one or more combining coefficient vectors may support the RIS controller 405 identifying which single-lobe patterns are to be used with each combining coefficient vector, a combining rule used by the network entity 105-*b*, or both, for generating the one or more multi-lobe patterns.

At 440, the RIS controller 405 may determine one or more realizable multi-lobe beamforming patterns. In some cases, the RIS controller 405 may use the combining coefficient vectors to identify attributes of the one or more multi-lobe beamforming patterns, and may determine the one or more realizable multi-lobe beamforming patterns according to the identified attributes.

At 445, the RIS controller 405 may transmit, to the network entity 105-*b*, multi-lobe beam information of the RIS, which may indicate information about the set of one or more multi-lobe beamforming patterns the RIS is capable of creating. In some cases, the multi-lobe beam information may include the identified attributes for the multi-lobe beams. For example, the attributes for a multi-lobe beam may indicate respective pointing angles for each main lobe of the multi-lobe beam, respective beamwidths for each main lobe of the multi-lobe beam, respective peak gain information (e.g., values) for each main lobe of the multi-lobe beam, an indication of whether reciprocity holds for the multi-lobe beam, or any combination thereof.

In some cases, the pointing angles for the multi-lobe beam may be implied (e.g., via quasi-correspondence with single-lobe patterns) to be at least contained within the main lobes of corresponding single-lobe patterns (e.g., indicated by single-lobe pattern identifiers (IDs)) or may be inferred to be within a predetermined threshold of the pointing angles of the corresponding single-lobe patterns. Additionally, or alternatively, the one or more attributes may include a threshold value and a distance range associated with each main lobe of the multi-lobe beam, which may indicate the distance range along a direction over which a gain of a main lobe is within the threshold value of the peak gain of the main lobe. In some cases, the respective peak gain value for each main lobe of the multi-lobe beam may be indicated by a relative difference with respect to a common reference value. In some other cases, a single gain value associated with the multi-lobe beam may be included (e.g., as a relative difference with respect to the common reference value), which may imply that a peak gain value of each main lobe exceeds the single gain value.

At 450, the network entity 105-*b* may transmit, to the RIS controller 405, a RIS configuration for the RIS to employ. For example, the network entity 105-*b* may select a realizable multi-lobe beamforming pattern of the one or more realizable multi-lobe beamforming patterns supported by the RIS, and may indicate the selected realizable multi-lobe beamforming pattern to the RIS controller 405. The network entity 105-*b* may subsequently performed beamformed communication with one or more UEs via the RIS as described herein.

Figure 5:
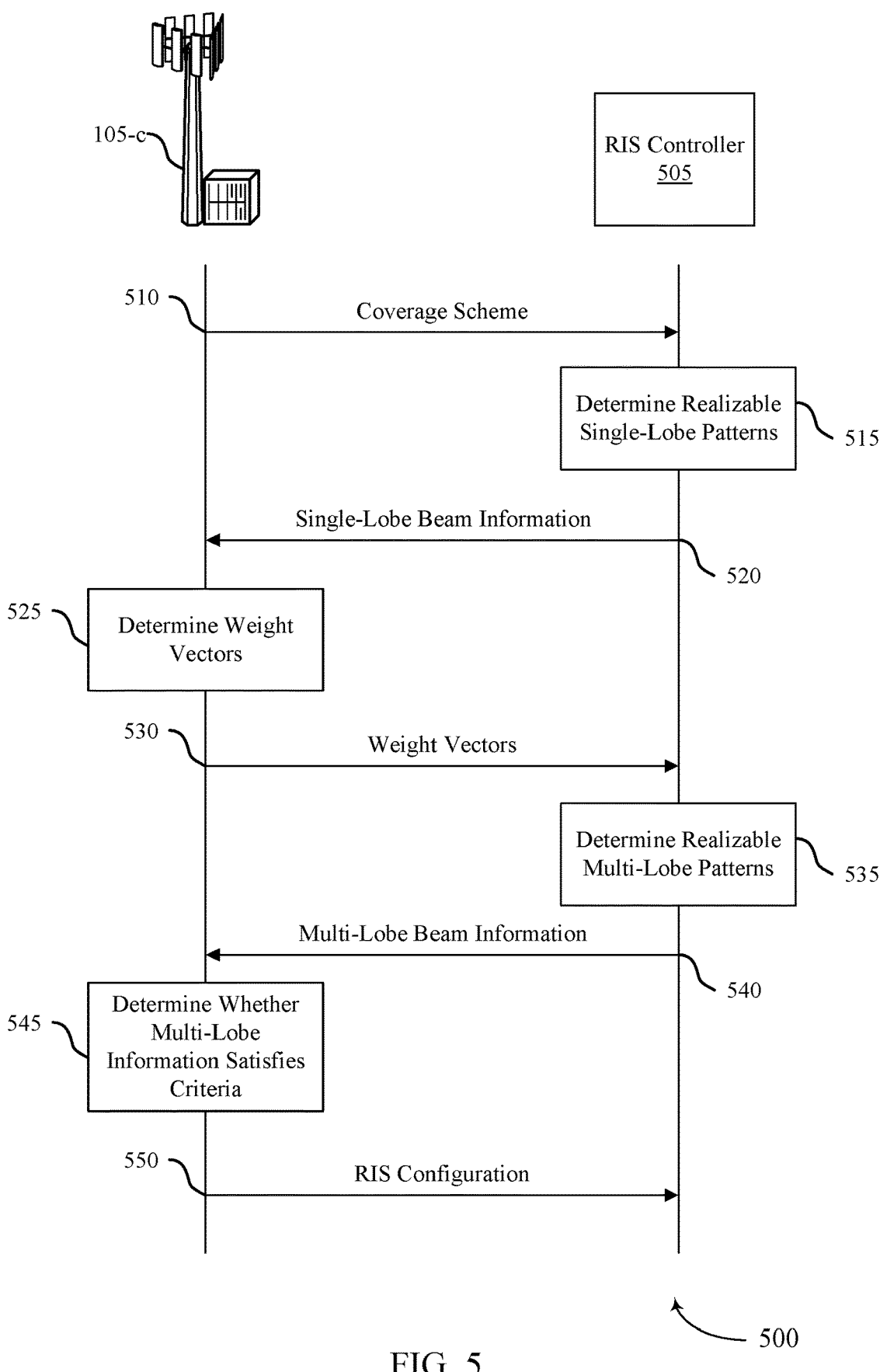
FIG. 5 illustrates an example of a process flow that supports multi-lobe beams based on RIS indication in accordance with one or more aspects of the present disclosure.

FIG. 5 illustrates an example of a process flow 500 that supports multi-lobe beams based on RIS indication in accordance with one or more aspects of the present disclosure. The process flow 500 may be implemented by one or more aspects of the wireless communications systems 201 and 202. For example, the process flow 500 may be an example of signaling between a network entity 105-*c* and a RIS controller 505, which may be examples of corresponding devices described with reference to FIGS. 2A and 2B. In some cases, the network entity 105-*c* may communicate with the RIS controller 505 to relay, via a RIS associated with the RIS controller 505, a multi-lobe beam between the network entity 105-c and one or more UEs 115. In some examples, the signaling between the network entity 105-c and the RIS controller 505 may be performed via a control link, and may include control messages such as RRC messages, DCI messages, MAC-CEs, UCI messages, or the like. Alternative examples of the following may be implemented, where some processes are performed in a different order than described or are not performed. In some cases, processes may include additional features not mentioned below, or further processes may be added.

In some cases, the network entity 105-c may configure multi-lobe beams according to a linear combination based multi-lobe design (e.g., constructing multi-lobe patterns by using individually optimized single-lobe patterns), which may be an example of corresponding techniques described with reference to FIG. 4 (e.g., to find a best metric for the unit-magnitude coefficient $\alpha$).

At 510, the network entity 105-c may transmit, to the RIS controller 505, a coverage scheme (e.g., a desired, requested, or preferred beamforming coverage scheme), which may provide one or more inputs to the RIS controller 505 (or another network entity 105 associated with the RIS). In some cases, the one or more inputs may include an incident signal direction from the network entity 105-c and the RIS, a distance between the network entity 105-b and the RIS, a range of reflected angles for relaying a multi-lobe beam (e.g., a range of required reflected angles), or any combination thereof. Additionally, or alternatively, the one or more inputs may include a set of one or more angles corresponding to a set of one or more UEs 115 communicating with the network entity 105-c and a set of distance ranges for each angle of the one or more angles (e.g., indicating expected UE 115 distances along a corresponding angle).

At 515, the RIS controller 505 may determine one or more realizable single-lobe beamforming patterns supported by the RIS. For example, the RIS controller 505 may identify a set of single-lobe beams the RIS is capable of creating (e.g., a basic single-lobe codebook). In some cases, a single-lobe beamforming pattern for a single-lobe beam may indicate a pointing direction associated with the single-lobe beam and a relative gain associated with the single-lobe beam.

At 520, the RIS controller 505 may transmit, to the network entity 105-c, single-lobe beam information indicating the one or more realizable single-lobe beamforming patterns supported by the RIS. For example, the network entity 105-c may receive a single-lobe codebook associated with the RIS.

At 525, the network entity 105-c may determine one or more weight vectors (e.g., priority vectors), which may include one or more weights for generating multi-lobe patterns at the RIS. In some cases, each weight vector may be associated with realizing a multi-lobe beam using a set of single-lobe beam patterns, where a higher weight may denote a higher priority of an associated single-lobe beamforming pattern (e.g., in the intended multi-lobe beamforming pattern). For example, the network entity 105-c may serve a first UE 115 and a second UE 115 via a multi-lobe beam that is configured according to a first single-lobe beamforming pattern and a second single-lobe beamforming pattern, respectively. In such an example, to support a higher directivity towards the first UE 115, the network entity 105-c may assign a higher weight (e.g., an amplitude indicative of relative priority) to the first single-lobe beamforming pattern relative to the second single-lobe beamforming pattern.

At 530, the network entity 105-c may transmit, to the RIS controller 505, the one or more weight vectors to support the RIS controller 505 identifying realizable multi-lobe beamforming patterns.

At 535, the RIS controller 505 may determine one or more realizable multi-lobe beamforming patterns supported by the RIS based on receiving the one or more weight vectors. For example, receiving the one or more weight vectors may support the RIS controller 505 identifying which single-lobe patterns are to be used with each weight coefficient vector.

At 540, the RIS controller 505 may transmit, to the network entity 105-c, multi-lobe beam information of the RIS, which may indicate information about the set of multi-lobe beamforming patterns the RIS is capable of creating in accordance with the relative priorities for various single-lobe beamforming patterns indicated by the one or more weight vectors. In some cases, the multi-lobe beam information may include the identified attributes for the multi-lobe beams. For example, the attributes for a multi-lobe beam may indicate respective pointing angles for each main lobe of the multi-lobe beam, respective beamwidths for each main lobe of the multi-lobe beam, respective peak gain information (e.g., values) for each main lobe of the multi-lobe beam, an indication of whether reciprocity holds for the multi-lobe beam, or any combination thereof.

In some cases, the pointing angles for the multi-lobe beam may be implied (e.g., via quasi-correspondence with single-lobe patterns) to be at least contained within the main lobes of corresponding single-lobe patterns (e.g., indicated by single-lobe pattern identifiers (IDs)) or may be inferred to be within a predetermined threshold of the pointing angles of the corresponding single-lobe patterns. Additionally, or alternatively, the one or more attributes may include a threshold value and a distance range associated with each main lobe of the multi-lobe beam, which may indicate the distance range along a direction over which a gain of a main lobe is within the threshold value of the peak gain of the main lobe. In some cases, the respective peak gain value for each main lobe of the multi-lobe beam may be indicated by a relative difference with respect to a common reference value. In some other cases, a single gain value associated with the multi-lobe beam may be included (e.g., as a relative difference with respect to the common reference value), which may imply that a peak gain value of each main lobe exceeds the single gain value.

At 545, the network entity 105-c may determine whether the multi-lobe beamforming patterns indicated by the multi-lobe beam information satisfies one or more criteria. For example, the network entity 105-c may determine whether the multi-lobe beamforming patterns satisfy a traffic criterion, one or more profiles associated with served UEs 115, a channel condition criterion, or any combination thereof. In some cases, such as if the multi-lobe beamforming patterns fail to satisfy the one or more criteria, the network entity 105-c may return to 525 and determine (e.g., recompute) a new set of weight vectors (e.g., including modified prioritization values). In some other cases, such as if the multi-lobe beamforming patterns satisfy the one or more criteria, the network entity 105-c may proceed to 550.

At 550, the network entity 105-c may transmit, to the RIS controller 505, a RIS configuration for the RIS to employ. For example, the network entity 105-c may select a realizable multi-lobe beamforming pattern of the one or more realizable multi-lobe beamforming patterns supported by the RIS, and may indicate the selected realizable multi-lobe beamforming pattern to the RIS controller 505.

Figure 6:
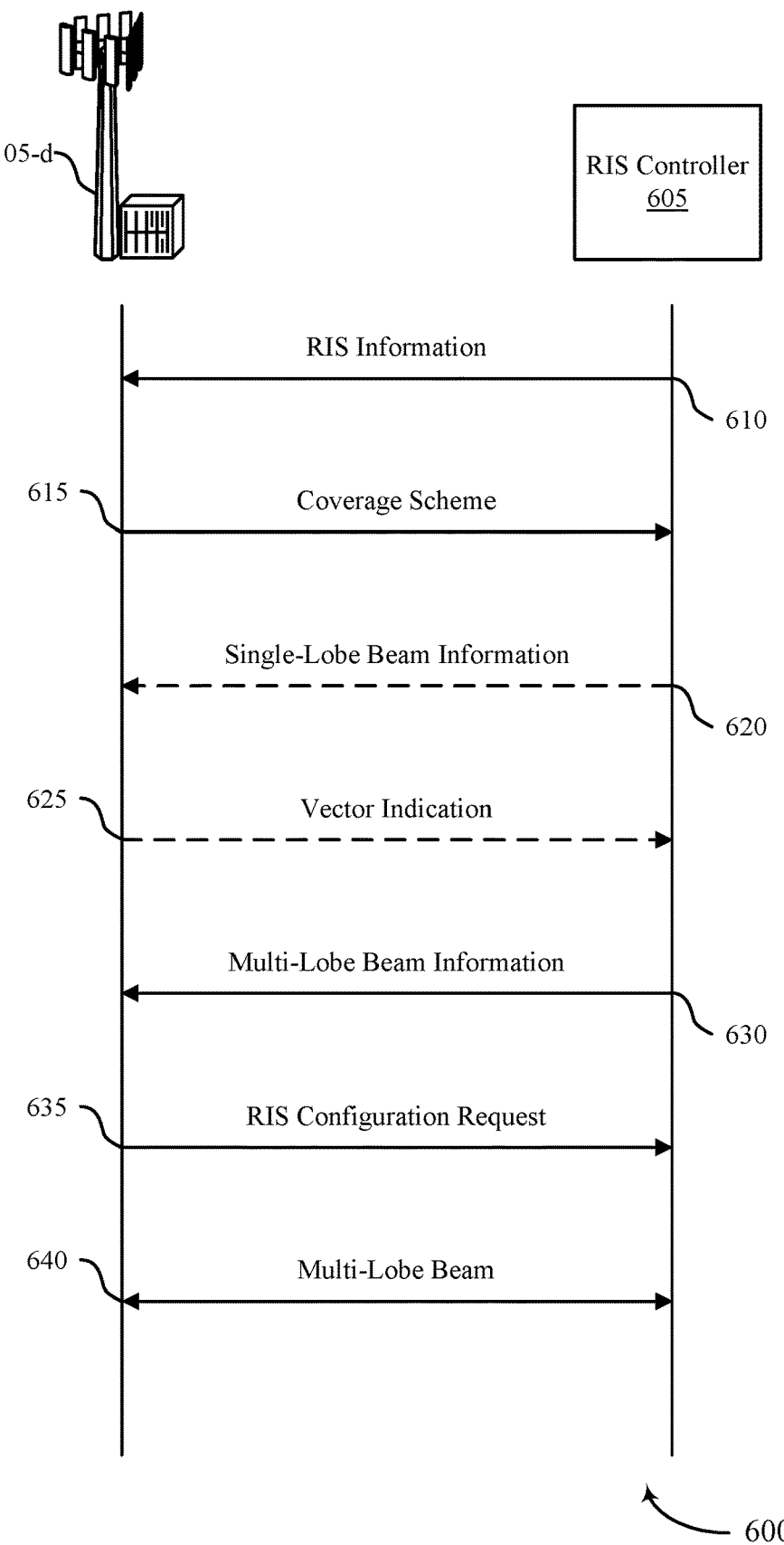
FIG. 6 illustrates an example of a process flow that supports multi-lobe beams based on RIS indication in accordance with one or more aspects of the present disclosure.

FIG. 6 illustrates an example of a process flow 600 that supports multi-lobe beams based on RIS indication in accordance with one or more aspects of the present disclosure. The process flow 600 may be implemented by one or more aspects of the wireless communications systems 201 and 202. For example, the process flow 600 may be an example of signaling between a network entity 105-d and a RIS controller 605, which may be examples of corresponding devices described with reference to FIGS. 2A and 2B. In some cases, the network entity 105-d may communicate with the RIS controller 605 to relay, via a RIS associated with the RIS controller 605, a multi-lobe beam between the network entity 105-d and one or more UEs 115. In some examples, the signaling between the network entity 105-d and the RIS controller 605 may be performed via a control link, and may include control messages such as RRC messages, DCI messages, MAC-CEs, UCI messages, or the like. Alternative examples of the following may be implemented, where some processes are performed in a different order than described or are not performed. In some cases, processes may include additional features not mentioned below, or further processes may be added.

At 610, the RIS controller 605 may transmit, to the network entity 105-d, information associated with the RIS. For example, the RIS information may include capability information of the RIS, the capability information indicating a reflection coefficient alphabet associated with the RIS (e.g., a binary alphabet or a quaternary alphabet), element control information for the RIS (e.g., per-element control or per-group control), or both. Additionally, or alternatively, the RIS information may indicate, via a control message, a single-lobe beamforming codebook supported by the RIS and one or more beams that the RIS is capable of simultaneously creating from the single-lobe beamforming codebook. In some other examples, the RIS information may indicate a single-lobe beamforming codebook, a multi-lobe beamforming codebook, and a QCL correspondence between one or more beams of the single-lobe beamforming codebook and one or more multi-lobe beam patterns of the multi-lobe beamforming codebook.

At 615, the network entity 105-d may transmit, to the RIS controller 605, an indication of a beamforming coverage scheme (e.g., a desired, requested, or preferred beamforming coverage scheme). For example, the beamforming coverage scheme may indicate a quantity of beams and a set of multiple beam pointing directions for the quantity of beams for a multi-lobe incident beam (e.g., in an uplink scenario) or for a multi-lobe reflect beam (e.g., in a downlink scenario) of the RIS for relay of communication between the network entity 105-d and one or more UEs 115. The beamforming coverage scheme may identify an incident signal direction between the network entity 105-d and the RIS, a distance between the network entity 105-d and the RIS, a range of reflect beam pointing angles associated with the multiple beam pointing directions, one or more reflect beam pointing angles associated with the one or more UEs 115, one or more distance ranges associated with the one or more UEs 115, or any combination thereof. In some cases, each beam associated with the multi-lobe incident beam or the multi-lobe reflect beam may be associated with at least one UE 115 of the one or more UEs 115 (e.g., a single UE 115 or a group of UEs 115).

In some cases, the beamforming cover scheme may be transmitted based on receiving the RIS information. For example, the beamforming coverage scheme may identify a set of multiple beam indexes (e.g., a TCI state, an SSB index, or a RIS configuration element in at least one RIS configuration codebook) from the single-lobe beamforming codebook. Additionally, or alternatively, the beamforming coverage scheme may identify one or more beams from the single-lobe beamforming codebook or one or more multi-lobe beam patterns of the multi-lobe beamforming codebook based on the control message and the QCL correspondence.

At 620, the RIS controller 605 may transmit, to the network entity 105-d, single-lobe beam information of the RIS based on receiving the beamforming coverage scheme. In some cases, the single-lobe beamforming information may indicate one or more realizable single-lobe beamforming patterns supported by the RIS. For example, the RIS controller 605 may determine the one or more realizable single-lobe beamforming patterns and attributes associated with one or more realizable single-lobe beamforming patterns, and may share such information with the network entity 105-d.

At 625, the network entity 105-d may transmit, to the RIS controller 605, an indication of a set of multiple vectors for generating one or more multi-lobe beamforming patterns. In some cases, such as when the network entity 105-d receives capability information associated with the RIS, the network entity 105-d may indicate one or more combining coefficients for combining two or more of the set of multiple vectors in accordance with the reflection coefficient alphabet. In some cases, the combining coefficient vector may be a complex scalar (e.g., with an amplitude and phase) for linearly combining a single-lobe beam. Additionally, or alternatively, the network entity 105-d may indicate one or more first vectors (e.g., weight vectors) identifying a first priority associated with respective realizable single-lobe beamforming patterns of the one or more realizable single-lobe beamforming patterns. In some examples, such as when first multi-lobe beam information of the RIS fails to satisfy one or more conditions (e.g., traffic, user profiles, channel conditions, or the like), the network entity 105-d may indicate one or more second vectors identifying a second priority (e.g., a modified priority) associated with the respective realizable single-lobe beamforming patterns, and may receive second multi-lobe beam information of the RIS based on the one or more second vectors.

At 630, the RIS controller 605 may transmit, to the network entity 105-d, multi-lobe beam information of the RIS. For example, the multi-lobe beam information may indicate one or more realizable multi-lobe beamforming patterns supported by the RIS in accordance with the beamforming coverage scheme. In some cases, the multi-lobe beam information may include one or more attributes for the multi-lobe beams associated with the one or more realizable multi-lobe beamforming patterns. For example, the attributes for the multi-lobe incident beam or the multi-lobe reflect beam may indicate respective pointing angles associated with the one or more beams, respective beamwidths associated with the one or more beams, respective first gain values associated with the one or more beams, a second gain value associated with the one or more beams, reciprocity information associated with the one or more beams, or any combination thereof. In some examples, the multi-lobe beam information may be communicated in tabular form, where an indication of a table (e.g., via control signaling) may identify the one or more multi-lobe beamforming patterns and corresponding attributes.

At 635, the network entity 105-d may transmit, to the RIS controller 605, a RIS configuration request. In some cases, the RIS configuration request may include a request to use a realizable multi-lobe beamforming pattern of the one or more multi-lobe beamforming patterns indicated in the multi-lobe beam information.

At 640, the network entity 105-*d* may communicate with the one or more UEs 115 via the RIS using the multi-lobe incident beam or the multi-lobe reflect beam based on the beamforming coverage scheme and the multi-lobe beam information.

Figure 7:
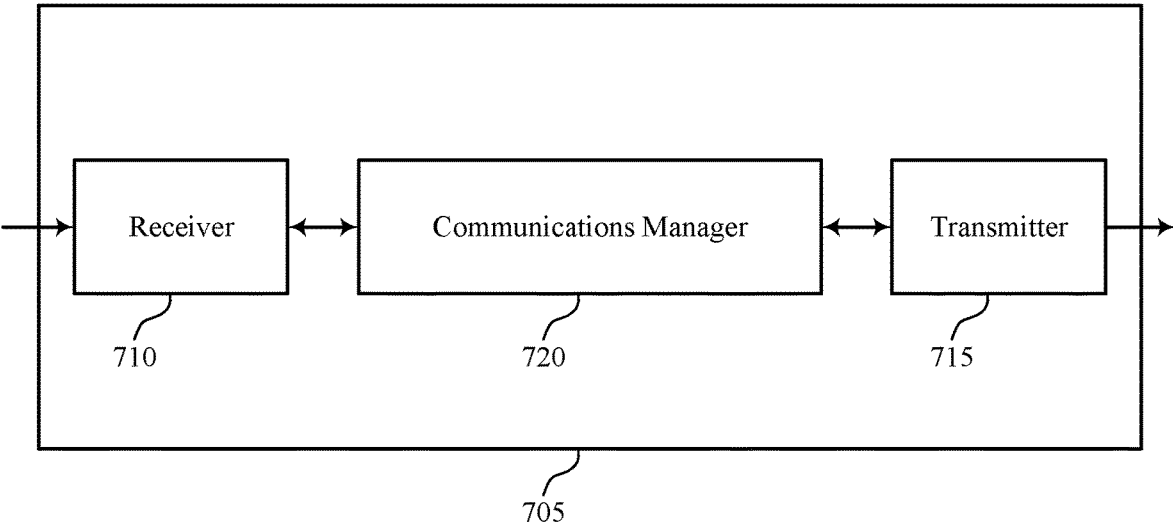
FIGS. 7 and 8 illustrate block diagrams of devices that support multi-lobe beams based on RIS indication in accordance with one or more aspects of the present disclosure.

FIG. 7 illustrates a block diagram 700 of a device 705 that supports multi-lobe beams based on RIS indication in accordance with one or more aspects of the present disclosure. The device 705 may be an example of aspects of a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of multi-lobe beams based on RIS indication as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a network entity in accordance with examples as disclosed herein. For example, the communications manager 720 may be configured as or otherwise support a means for transmitting an indication of a beamforming coverage scheme to a controller of a RIS, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The communications manager 720 may be configured as or otherwise support a means for receiving multi-lobe beam information of the RIS, the multi-lobe beam information indicating a realizable multi-lobe beamforming pattern supported by the RIS in accordance with the beamforming coverage scheme. The communications manager 720 may be configured as or otherwise support a means for communicating one or more messages with the one or more UEs via the RIS based on the beamforming coverage scheme and the multi-lobe beam information.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for increasing a reliability of communications by configuring a RIS according to a beamforming coverage scheme.

Figure 8:
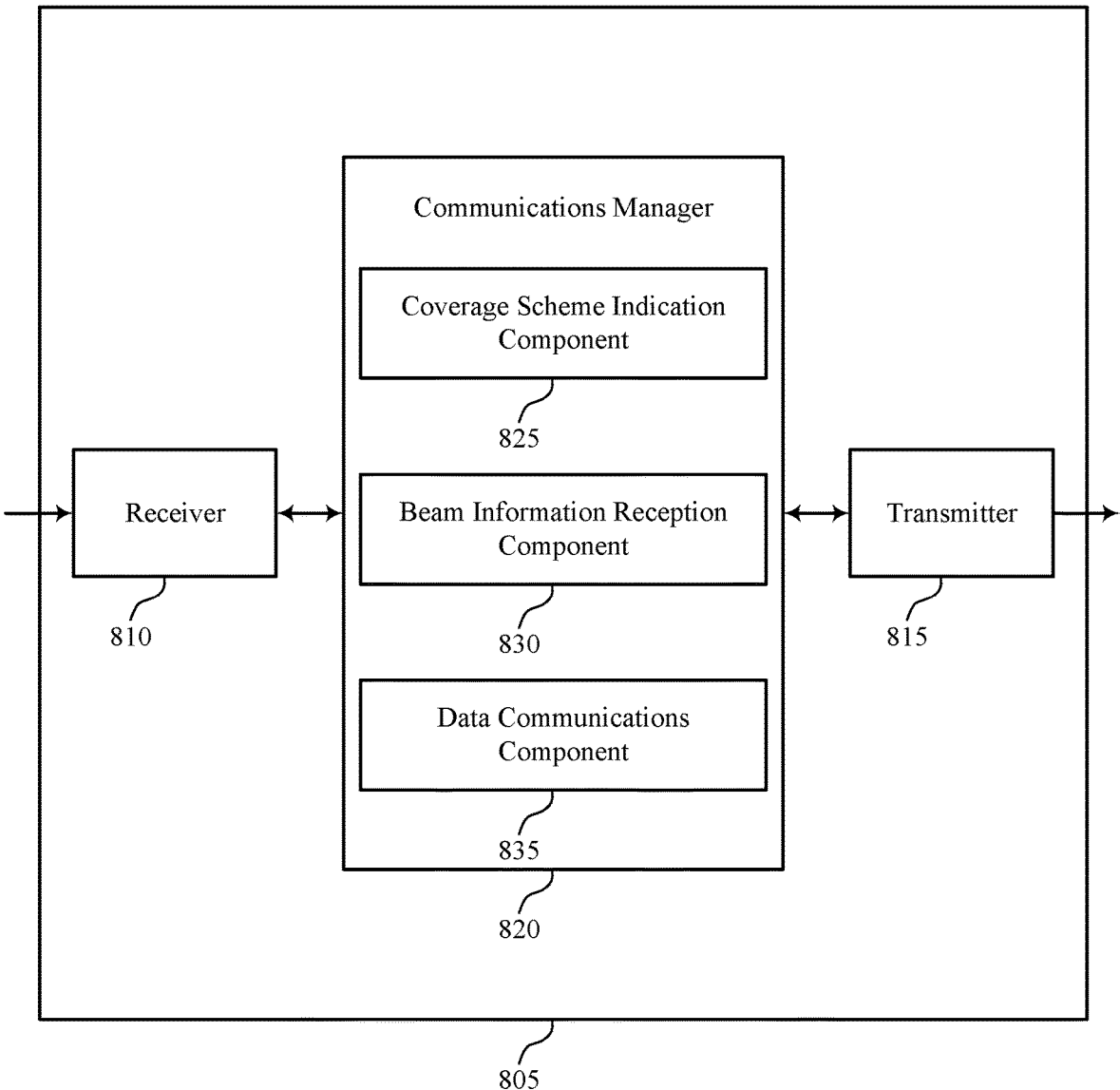

FIG. 8 illustrates a block diagram 800 of a device 805 that supports multi-lobe beams based on RIS indication in accordance with one or more aspects of the present disclosure. The device 805 may be an example of aspects of a device 705 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of multi-lobe beams based on RIS indication as described herein. For example, the communications manager 820 may include a coverage scheme indication component 825, a beam information reception component 830, a data communications component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. The coverage scheme indication component 825 may be configured as or otherwise support a means for transmitting an indication of a beamforming coverage scheme to a controller of a RIS, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The beam information reception component 830 may be configured as or otherwise support a means for receiving multi-lobe beam information of the RIS, the multi-lobe beam information indicating a realizable multi-lobe beamforming pattern supported by the RIS in accordance with the beamforming coverage scheme. The data communications component 835 may be configured as or otherwise support a means for communicating one or more messages with the one or more UEs via the RIS based on the beamforming coverage scheme and the multi-lobe beam information.

Figure 9:
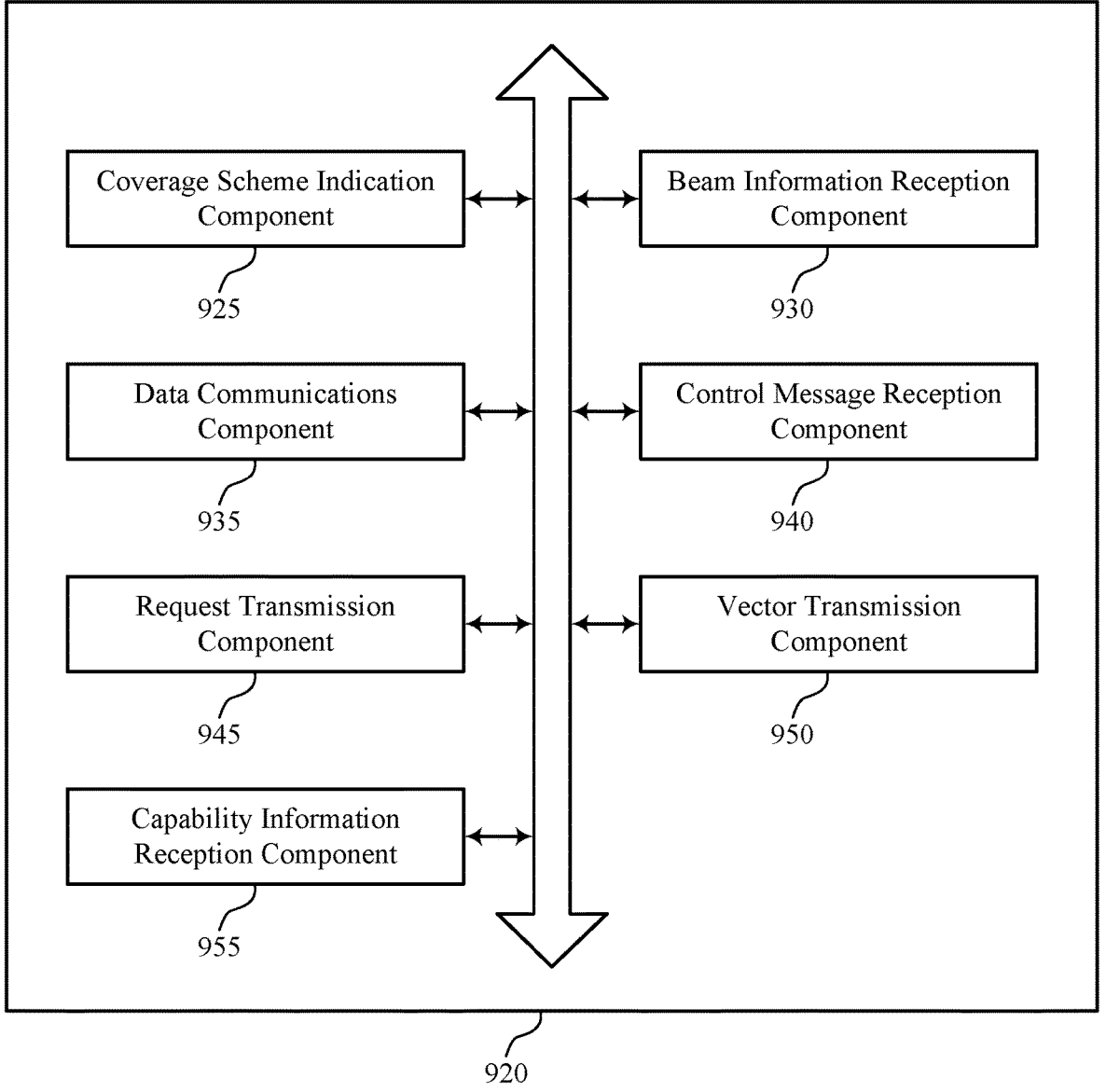
FIG. 9 illustrates a block diagram of a communications manager that supports multi-lobe beams based on RIS indication in accordance with one or more aspects of the present disclosure.

FIG. 9 illustrates a block diagram 900 of a communications manager 920 that supports multi-lobe beams based on RIS indication in accordance with one or more aspects of the present disclosure. The communications manager 920 may be an example of aspects of a communications manager 720, a communications manager 820, or both, as described herein. The communications manager 920, or various components thereof, may be an example of means for performing various aspects of multi-lobe beams based on RIS indication as described herein. For example, the communications manager 920 may include a coverage scheme indication component 925, a beam information reception component 930, a data communications component 935, a control message reception component 940, a request transmission component 945, a vector transmission component 950, a capability information reception component 955, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communication at a network entity in accordance with examples as disclosed herein. The coverage scheme indication component 925 may be configured as or otherwise support a means for transmitting an indication of a beamforming coverage scheme to a controller of a RIS, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The beam information reception component 930 may be configured as or otherwise support a means for receiving multi-lobe beam information of the RIS, the multi-lobe beam information indicating a realizable multi-lobe beamforming pattern supported by the RIS in accordance with the beamforming coverage scheme. The data communications component 935 may be configured as or otherwise support a means for communicating one or more messages with the one or more UEs via the RIS based on the beamforming coverage scheme and the multi-lobe beam information.

In some examples, the control message reception component 940 may be configured as or otherwise support a means for receiving a control message indicating a single-lobe beamforming codebook supported by the RIS and one or more beams that the RIS is capable of simultaneously creating from the single-lobe beamforming codebook, where the indication of the beamforming coverage scheme is transmitted in response to receiving the control message.

In some examples, to support transmitting the indication of the beamforming coverage scheme, the coverage scheme indication component 925 may be configured as or otherwise support a means for transmitting the indication of the beamforming coverage scheme that identifies a set of multiple beam indexes from the single-lobe beamforming codebook.

In some examples, the control message reception component 940 may be configured as or otherwise support a means for receiving a control message indicating a single-lobe beamforming codebook, a multi-lobe beamforming codebook, and a quasi-colocation correspondence between one or more beams of the single-lobe beamforming codebook and one or more multi-lobe beam patterns of the multi-lobe beamforming codebook, where the indication of the beamforming coverage scheme identifies one or more beams from the single-lobe beamforming codebook or one or more multi-lobe beam patterns of the multi-lobe beamforming codebook based on the control message and the quasi-colocation correspondence.

In some examples, to support transmitting the indication of the beamforming coverage scheme, the coverage scheme indication component 925 may be configured as or otherwise support a means for transmitting the indication including an incident signal direction between the network entity and the RIS, a distance between the network entity and the RIS, a range of reflect beam pointing angles associated with the set of multiple beam pointing directions, one or more reflect beam pointing angles associated with the one or more UEs, one or more distance ranges associated with the one or more UEs, or any combination thereof.

In some examples, to support receiving the multi-lobe beam information, the beam information reception component 930 may be configured as or otherwise support a means for receiving the multi-lobe beam information indicating one or more attributes of one or more beams associated with the realizable multi-lobe beamforming pattern, the one or more attributes including respective pointing angles associated with the one or more beams, respective beamwidths associated with the one or more beams, respective first gain values associated with the one or more beams, a second gain value associated with the one or more beams, reciprocity information associated with the one or more beams, or any combination thereof.

In some examples, to support receiving the multi-lobe beam information, the beam information reception component 930 may be configured as or otherwise support a means for receiving an indication of a table indicating one or more multi-lobe beamforming patterns, where the one or more multi-lobe beamforming patterns include at least the realizable multi-lobe beamforming pattern. In some examples, to support receiving the multi-lobe beam information, the request transmission component 945 may be configured as or otherwise support a means for transmitting a request to use the realizable multi-lobe beamforming pattern, where communicating the one or more messages is based on transmitting the request.

In some examples, the beam information reception component 930 may be configured as or otherwise support a means for receiving single-lobe beam information of the RIS based on transmitting the indication, the single-lobe beam information indicating one or more realizable single-lobe beamforming patterns supported by the RIS. In some examples, the vector transmission component 950 may be configured as or otherwise support a means for transmitting an indication of a set of multiple vectors for generating one or more multi-lobe beamforming patterns, where receiving the multi-lobe beam information is based on transmitting the set of multiple vectors.

In some examples, the capability information reception component 955 may be configured as or otherwise support a means for receiving capability information of the RIS, the capability information indicating a reflection coefficient alphabet associated with the RIS, element control information for the RIS, or both. In some examples, the vector transmission component 950 may be configured as or otherwise support a means for transmitting an indication of one or more combining coefficients for combining two or more of the set of multiple vectors in accordance with the reflection coefficient alphabet.

In some examples, the reflection coefficient alphabet is a binary alphabet or a quaternary alphabet.

In some examples, to support transmitting the indication of the set of multiple vectors, the vector transmission component 950 may be configured as or otherwise support a means for transmitting an indication of one or more first vectors identifying a first priority associated with respective realizable single-lobe beamforming patterns of the one or more realizable single-lobe beamforming patterns. In some examples, to support transmitting the indication of the set of multiple vectors, the beam information reception component 930 may be configured as or otherwise support a means for receiving first multi-lobe beamforming information of the RIS based on the one or more first vectors. In some examples, to support transmitting the indication of the set of multiple vectors, the vector transmission component 950 may be configured as or otherwise support a means for transmitting an indication of one or more second vectors identifying a second priority associated with the respective realizable single-lobe beamforming patterns based on the first multi-lobe beamforming information failing to satisfy one or more conditions. In some examples, to support transmitting the indication of the set of multiple vectors, the beam information reception component 930 may be configured as or otherwise support a means for receiving second multi-lobe beamforming information of the RIS based on the one or more second vectors.

In some examples, each beam associated with the multi-lobe incident beam or the multi-lobe reflect beam is associated with at least one UE of the one or more UEs.

Figure 10:
FIG. 10 illustrates a diagram of a system including a device that supports multi-lobe beams based on RIS indication in accordance with one or more aspects of the present disclosure.

FIG. 10 illustrates a diagram of a system 1000 including a device 1005 that supports multi-lobe beams based on RIS indication in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some examples, each processor of the one or more processors may be operable to perform or support a same set of operations, may be operable to perform or support a respective set of one or more operations, or a combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some examples, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting multi-lobe beams based on RIS indication). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some cases, each processor of the one or more processors may be capable of executing scripts or instructions of a respective set of one or more software programs stored in the device 1005. For example, a processor 1035 may include a first processor capable of executing scripts or instructions of one or more first software programs, a second processor capable of executing scripts or instructions of one or more second software programs, a third processor capable of executing scripts or instructions of one or more third software programs, and so on. Additionally, or alternatively, each processor of the one or more processors may be capable of executing scripts or instructions of each software program stored in the device 1005. In some implementations, the processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communication at a network entity in accordance with examples as disclosed herein. For example, the communications manager 1020 may be configured as or otherwise support a means for transmitting an indication of a beamforming coverage scheme to a controller of a RIS, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The communications manager 1020 may be configured as or otherwise support a means for receiving multi-lobe beam information of the RIS, the multi-lobe beam information indicating a realizable multi-lobe beamforming pattern supported by the RIS in accordance with the beamforming coverage scheme. The communications manager 1020 may be configured as or otherwise support a means for communicating one or more messages with the one or more UEs via the RIS based on the beamforming coverage scheme and the multi-lobe beam information.

By including or configuring the communications manager 1020 in accordance with examples as described herein, the device 1005 may support techniques for increasing a reliability of communications by configuring a RIS according to a beamforming coverage scheme.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, the processor 1035, the memory 1025, the code 1030, or any combination thereof. For example, the code 1030 may include instructions executable by the processor 1035 to cause the device 1005 to perform various aspects of multi-lobe beams based on RIS indication as described herein, or the processor 1035 and the memory 1025 may be otherwise configured to perform or support such operations.

Figure 11:
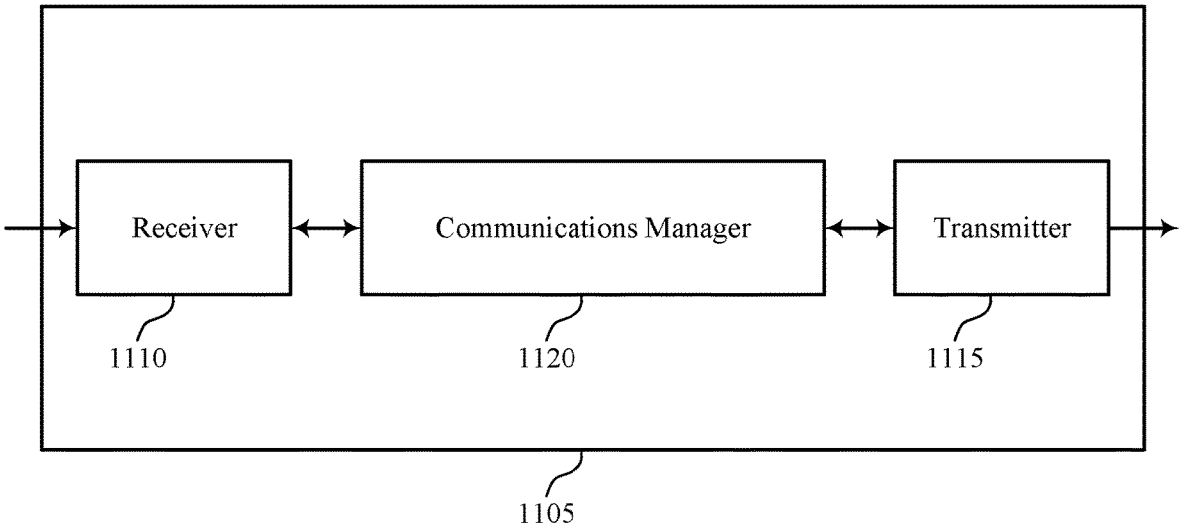
FIGS. 11 and 12 illustrate block diagrams of devices that support multi-lobe beams based on RIS indication in accordance with one or more aspects of the present disclosure.

FIG. 11 illustrates a block diagram 1100 of a device 1105 that supports multi-lobe beams based on RIS indication in accordance with one or more aspects of the present disclosure. The device 1105 may be an example of aspects of a RIS as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multi-lobe beams based on RIS indication). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multi-lobe beams based on RIS indication). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of multi-lobe beams based on RIS indication as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a RIS in accordance with examples as disclosed herein. For example, the communications manager 1120 may be configured as or otherwise support a means for receiving, from a network entity by a controller of the RIS, an indication of a beamforming coverage scheme, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The communications manager 1120 may be configured as or otherwise support a means for transmitting multi-lobe beam information of the RIS, the multi-lobe beam information indicating a realizable multi-lobe beamforming pattern supported by the RIS in accordance with the beamforming coverage scheme. The communications manager 1120 may be configured as or otherwise support a means for relaying one or more messages between the network entity and the one or more UEs via the multi-lobe incident beam or via the multi-lobe reflect beam based on the beamforming coverage scheme and the multi-lobe beam information.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for increasing a reliability of communications by configuring a RIS according to a beamforming coverage scheme.

Figure 12:
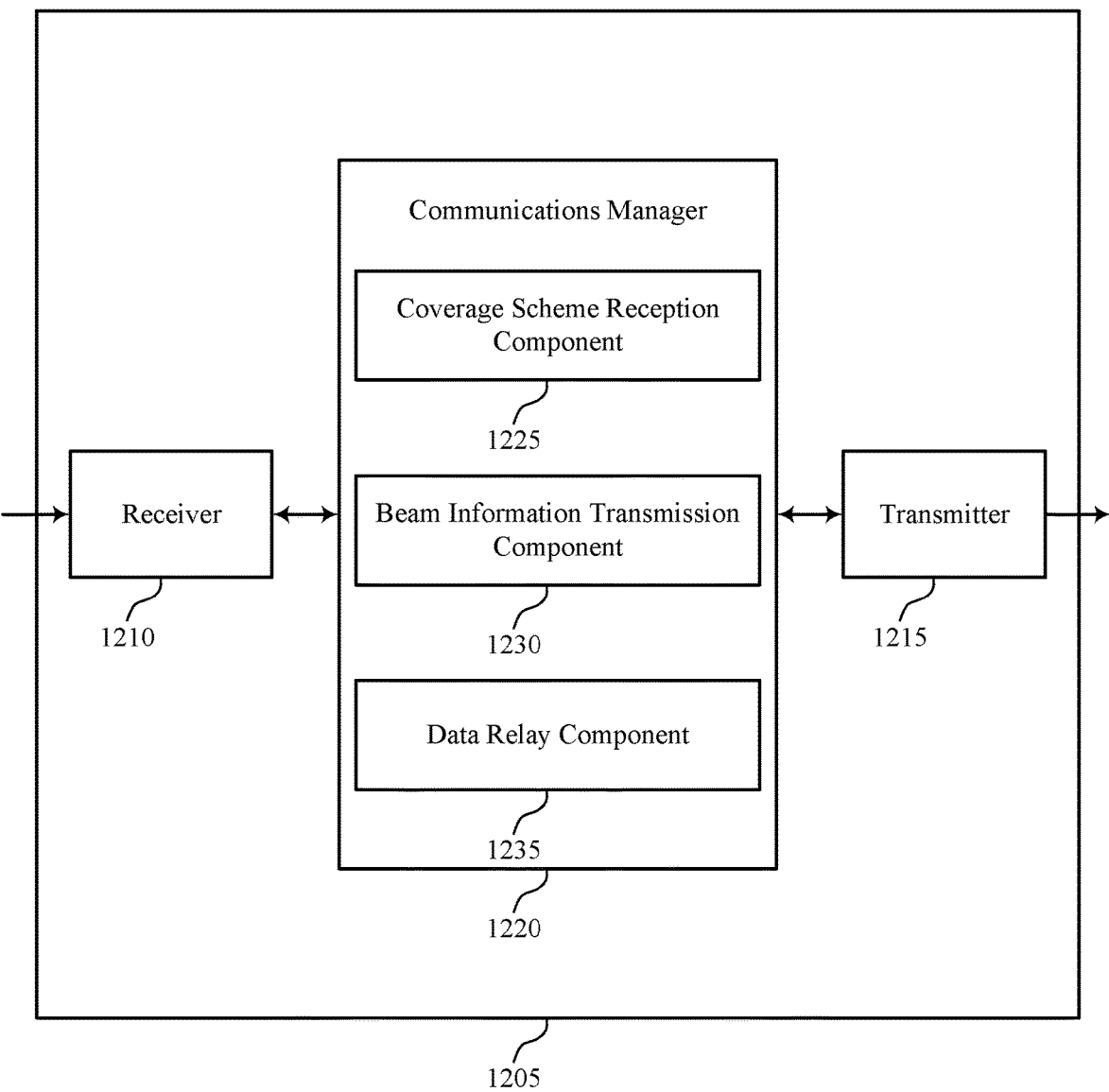

FIG. 12 illustrates a block diagram 1200 of a device 1205 that supports multi-lobe beams based on RIS indication in accordance with one or more aspects of the present disclosure. The device 1205 may be an example of aspects of a device 1105 or a RIS as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to multi-lobe beams based on RIS indication). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to multi-lobe beams based on RIS indication). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of multi-lobe beams based on RIS indication as described herein. For example, the communications manager 1220 may include a coverage scheme reception component 1225, a beam information transmission component 1230, a data relay component 1235, or any combination thereof. The communications manager 1220 may be an example of aspects of a communications manager 1120 as described herein. In some examples, the communications manager

1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a RIS in accordance with examples as disclosed herein. The coverage scheme reception component 1225 may be configured as or otherwise support a means for receiving, from a network entity by a controller of the RIS, an indication of a beamforming coverage scheme, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The beam information transmission component 1230 may be configured as or otherwise support a means for transmitting multi-lobe beam information of the RIS, the multi-lobe beam information indicating a realizable multi-lobe beamforming pattern supported by the RIS in accordance with the beamforming coverage scheme. The data relay component 1235 may be configured as or otherwise support a means for relaying one or more messages between the network entity and the one or more UEs via the multi-lobe incident beam or via the multi-lobe reflect beam based on the beamforming coverage scheme and the multi-lobe beam information.

Figure 13:
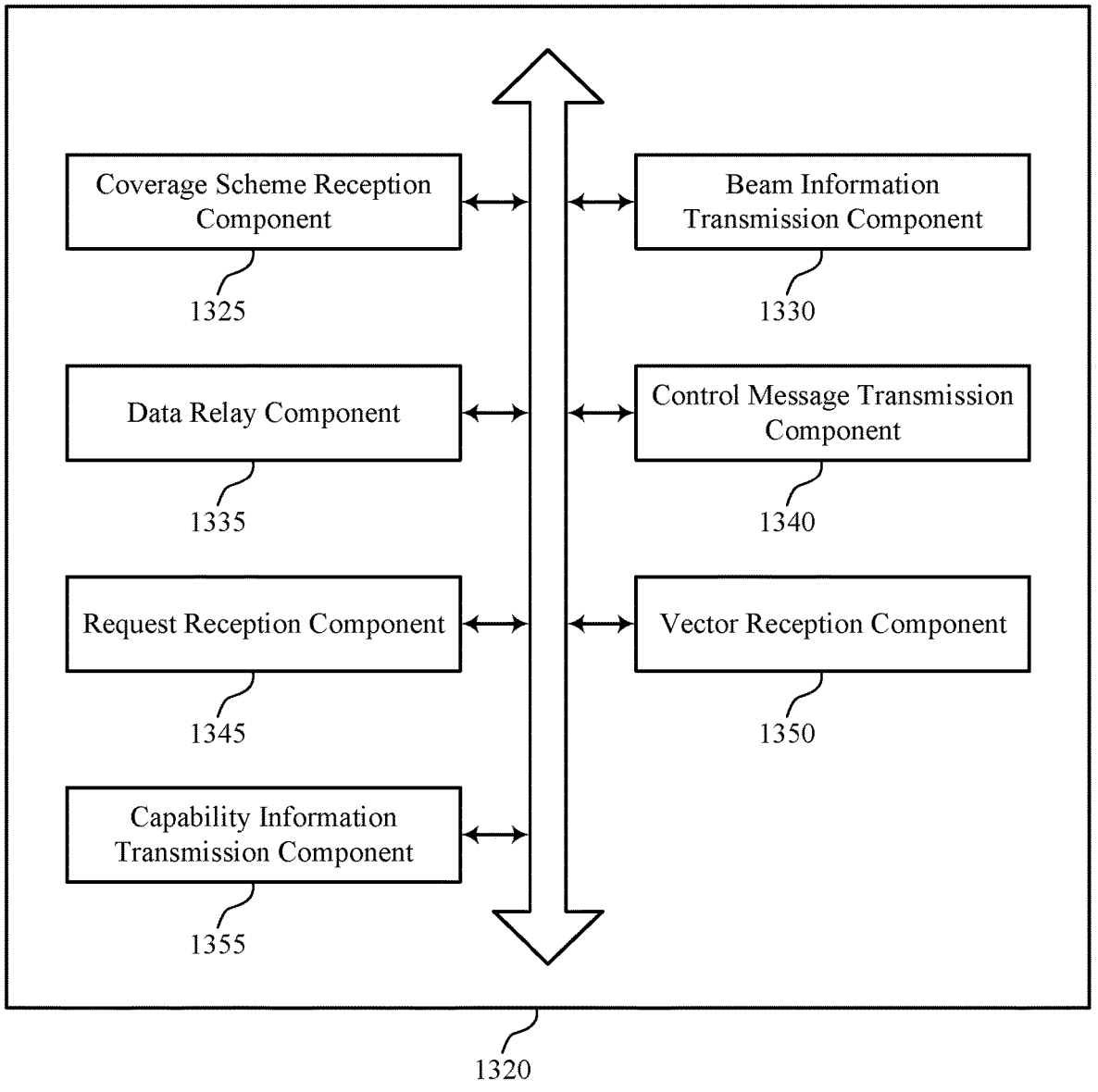
FIG. 13 illustrates a block diagram of a communications manager that supports multi-lobe beams based on RIS indication in accordance with one or more aspects of the present disclosure.

FIG. 13 illustrates a block diagram 1300 of a communications manager 1320 that supports multi-lobe beams based on RIS indication in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of multi-lobe beams based on RIS indication as described herein. For example, the communications manager 1320 may include a coverage scheme reception component 1325, a beam information transmission component 1330, a data relay component 1335, a control message transmission component 1340, a request reception component 1345, a vector reception component 1350, a capability information transmission component 1355, or any combination thereof. Each of these components may communicate, directly or indirectly, with one another (e.g., via one or more buses).

The communications manager 1320 may support wireless communications at a RIS in accordance with examples as disclosed herein. The coverage scheme reception component 1325 may be configured as or otherwise support a means for receiving, from a network entity by a controller of the RIS, an indication of a beamforming coverage scheme, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The beam information transmission component 1330 may be configured as or otherwise support a means for transmitting multi-lobe beam information of the RIS, the multi-lobe beam information indicating a realizable multi-lobe beamforming pattern supported by the RIS in accordance with the beamforming coverage scheme. The data relay component 1335 may be configured as or otherwise support a means for relaying one or more messages between the network entity and the one or more UEs via the multi-lobe incident beam or via the multi-lobe reflect beam based on the beamforming coverage scheme and the multi-lobe beam information.

In some examples, the control message transmission component 1340 may be configured as or otherwise support a means for transmitting a control message indicating a single-lobe beamforming codebook supported by the RIS and one or more beams that the RIS is capable of simultaneously creating from the single-lobe beamforming codebook, where the indication of the beamforming coverage scheme is received in response to transmitting the control message.

In some examples, to support receiving the indication of the beamforming coverage scheme, the coverage scheme reception component 1325 may be configured as or otherwise support a means for receiving the indication of the beamforming coverage scheme that identifies a set of multiple beam indexes from the single-lobe beamforming codebook.

In some examples, the control message transmission component 1340 may be configured as or otherwise support a means for transmitting a control message indicating a single-lobe beamforming codebook, a multi-lobe beamforming codebook, and a quasi-colocation correspondence between one or more beams of the single-lobe beamforming codebook and one or more multi-lobe beam patterns of the multi-lobe beamforming codebook, where the indication of the beamforming coverage scheme identifies one or more beams from the single-lobe beamforming codebook or one or more multi-lobe beam patterns of the multi-lobe beamforming codebook based on the control message and the quasi-colocation correspondence.

In some examples, to support receiving the indication of the beamforming coverage scheme, the coverage scheme reception component 1325 may be configured as or otherwise support a means for receiving the indication including an incident signal direction between the network entity and the RIS, a distance between the network entity and the RIS, a range of reflect beam pointing angles associated with the set of multiple beam pointing directions, one or more reflect beam pointing angles associated with the one or more UEs, one or more distance ranges associated with the one or more UEs, or any combination thereof.

In some examples, to support transmitting the multi-lobe beam information, the beam information transmission component 1330 may be configured as or otherwise support a means for transmitting the multi-lobe beam information indicating one or more attributes of one or more beams associated with the realizable multi-lobe beamforming pattern, the one or more attributes including respective pointing angles associated with the one or more beams, respective beamwidths associated with the one or more beams, respective first gain values associated with the one or more beams, a second gain value associated with the one or more beams, reciprocity information associated with the one or more beams, or any combination thereof.

In some examples, to support transmitting the multi-lobe beam information, the beam information transmission component 1330 may be configured as or otherwise support a means for transmitting an indication of a table indicating one or more multi-lobe beamforming patterns, where the one or more multi-lobe beamforming patterns include at least the realizable multi-lobe beamforming pattern. In some examples, to support transmitting the multi-lobe beam information, the request reception component 1345 may be configured as or otherwise support a means for receiving a request to use the realizable multi-lobe beamforming pattern, where relaying the one or more messages is based on transmitting the request.

In some examples, the beam information transmission component 1330 may be configured as or otherwise support a means for transmitting single-lobe beam information of the RIS based on receiving the indication, the single-lobe beam information indicating one or more realizable single-lobe beamforming patterns supported by the RIS. In some examples, the vector reception component 1350 may be configured as or otherwise support a means for receiving an indication of a set of multiple vectors for generating one or more multi-lobe beamforming patterns, where transmitting the multi-lobe beam information is based on receiving the set of multiple vectors.

In some examples, the capability information transmission component 1355 may be configured as or otherwise support a means for transmitting capability information of the RIS, the capability information indicating a reflection coefficient alphabet associated with the RIS, element control information for the RIS, or both. In some examples, the vector reception component 1350 may be configured as or otherwise support a means for receiving an indication of one or more combining coefficients for combining two or more of the set of multiple vectors in accordance with the reflection coefficient alphabet.

In some examples, the reflection coefficient alphabet is a binary alphabet or a quaternary alphabet.

In some examples, to support receiving the indication of the set of multiple vectors, the vector reception component 1350 may be configured as or otherwise support a means for receiving an indication of one or more first vectors identifying a first priority associated with respective realizable single-lobe beamforming patterns of the one or more realizable single-lobe beamforming patterns. In some examples, to support receiving the indication of the set of multiple vectors, the beam information transmission component 1330 may be configured as or otherwise support a means for transmitting first multi-lobe beamforming information of the RIS based on the one or more first vectors. In some examples, to support receiving the indication of the set of multiple vectors, the vector reception component 1350 may be configured as or otherwise support a means for receiving an indication of one or more second vectors identifying a second priority associated with the respective realizable single-lobe beamforming patterns based on the first multi-lobe beamforming information failing to satisfy one or more conditions. In some examples, to support receiving the indication of the set of multiple vectors, the beam information transmission component 1330 may be configured as or otherwise support a means for transmitting second multi-lobe beamforming information of the RIS based on the one or more second vectors.

In some examples, each beam associated with the multi-lobe incident beam or the multi-lobe reflect beam is associated with at least one UE of the one or more UEs.

Figure 14:
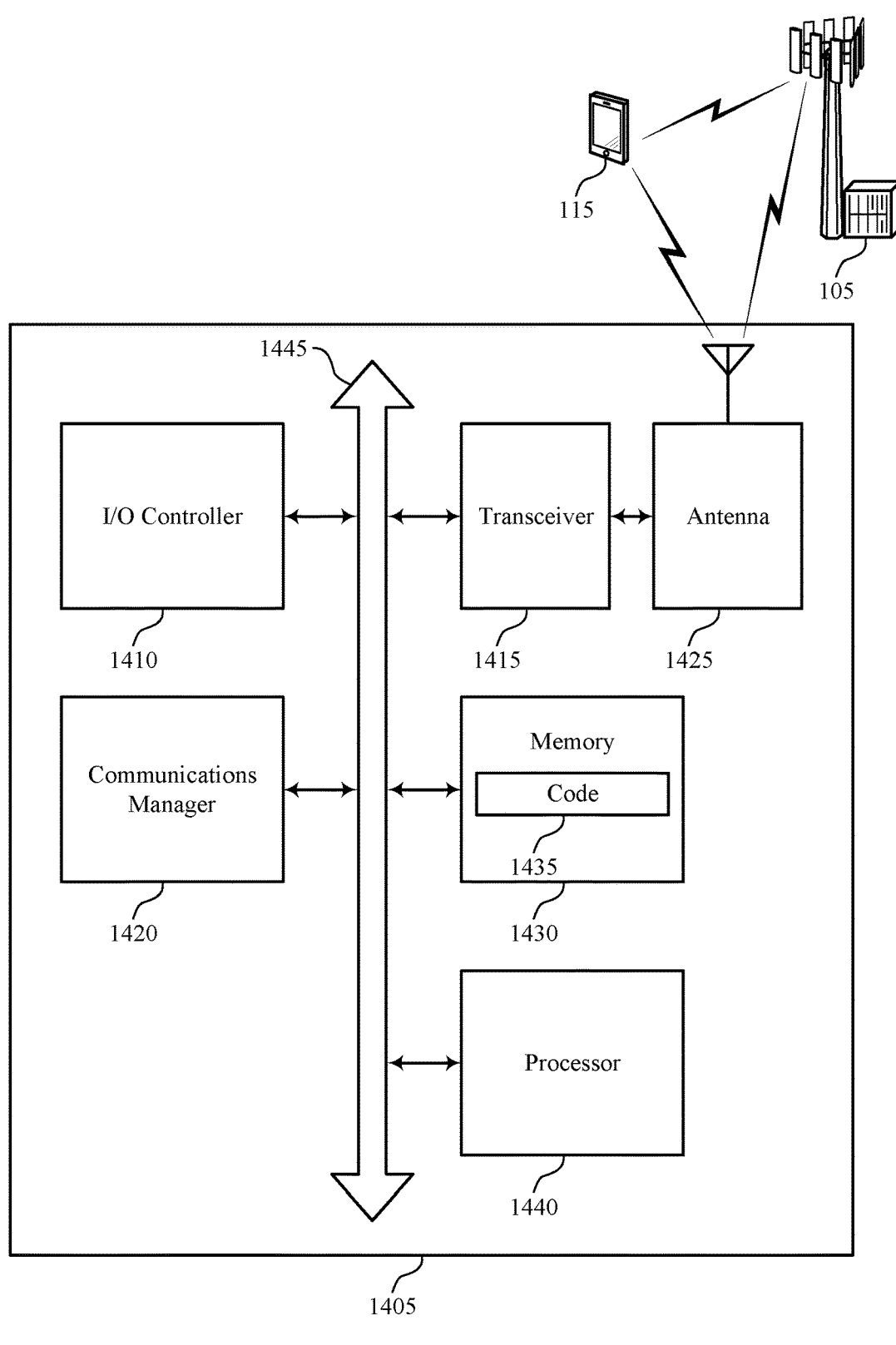
FIG. 14 illustrates a diagram of a system including a device that supports multi-lobe beams based on RIS indication in accordance with one or more aspects of the present disclosure.

FIG. 14 illustrates a diagram of a system 1400 including a device 1405 that supports multi-lobe beams based on RIS indication in accordance with one or more aspects of the present disclosure. The device 1405 may be an example of or include the components of a device 1105, a device 1205, or a RIS as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WIN-DOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting multi-lobe beams based on RIS indication). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communications at a RIS in accordance with examples as disclosed herein. For example, the communications manager 1420 may be configured as or otherwise support a means for receiving, from a network entity by a controller of the RIS, an indication of a beamforming coverage scheme, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The communications manager 1420 may be configured as or otherwise support a means for transmitting multi-lobe beam information of the RIS, the multi-lobe beam information indicating a realizable multi-lobe beamforming pattern supported by the RIS in accordance with the beamforming coverage scheme. The communications manager 1420 may be configured as or otherwise support a means for relaying one or more messages between the network entity and the one or more UEs via the multi-lobe incident beam or via the multi-lobe reflect beam based on the beamforming coverage scheme and the multi-lobe beam information.

By including or configuring the communications manager 1420 in accordance with examples as described herein, the device 1405 may support techniques for increasing a reliability of communications by configuring a RIS according to a beamforming coverage scheme.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of multi-lobe beams based on RIS indication as described herein, or the processor 1440 and the memory 1430 may be otherwise configured to perform or support such operations.

FIG. 15 illustrates a flowchart showing a method 1500 that supports multi-lobe beams based on RIS indication in accordance with one or more aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include transmitting an indication of a beamforming coverage scheme to a controller of a RIS, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The operations of 1505 may be performed in accordance with examples as disclosed herein. In some examples, aspects of the operations of 1505 may be performed by a coverage scheme indication component 925 as described with reference to FIG. 9.

At 1510, the method may include receiving multi-lobe beam information of the RIS, the multi-lobe beam information indicating a realizable multi-lobe beamforming pattern supported by the RIS in accordance with the beamforming coverage scheme. The operations of 1510 may be performed in accordance with examples as disclosed herein. In some examples, aspects of the operations of 1510 may be performed by a beam information reception component 930 as described with reference to FIG. 9.

At 1515, the method may include communicating one or more messages with the one or more UEs via the RIS based on the beamforming coverage scheme and the multi-lobe beam information. The operations of 1515 may be performed in accordance with examples as disclosed herein. In some examples, aspects of the operations of 1515 may be performed by a data communications component 935 as described with reference to FIG. 9.

FIG. 16 illustrates a flowchart showing a method 1600 that supports multi-lobe beams based on RIS indication in accordance with one or more aspects of the present disclosure. The operations of the method 1600 may be implemented by a RIS or its components as described herein. For example, the operations of the method 1600 may be performed by a RIS as described with reference to FIGS. 1 through 6 and 11 through 14. In some examples, a RIS controller may execute a set of instructions to control the functional elements of the RIS to perform the described functions. Additionally, or alternatively, the RIS may perform aspects of the described functions using special-purpose hardware.

At 1605, the method may include receiving, from a network entity by a controller of the RIS, an indication of a beamforming coverage scheme, the beamforming coverage scheme indicating a quantity of beams and a set of multiple beam pointing directions for the quantity of beams for a multi-lobe incident beam or for a multi-lobe reflect beam of the RIS for relay of communication between the network entity and one or more UEs. The operations of 1605 may be performed in accordance with examples as disclosed herein. In some examples, aspects of the operations of 1605 may be performed by a coverage scheme reception component 1325 as described with reference to FIG. 13.

At 1610, the method may include transmitting multi-lobe beam information of the RIS, the multi-lobe beam information indicating a realizable multi-lobe beamforming pattern supported by the RIS in accordance with the beamforming coverage scheme. The operations of 1610 may be performed in accordance with examples as disclosed herein. In some examples, aspects of the operations of 1610 may be performed by a beam information transmission component 1330 as described with reference to FIG. 13.

At 1615, the method may include relaying one or more messages between the network entity and the one or more UEs via the multi-lobe incident beam or via the multi-lobe reflect beam based on the beamforming coverage scheme and the multi-lobe beam information. The operations of 1615 may be performed in accordance with examples as disclosed herein. In some examples, aspects of the operations of 1615 may be performed by a data relay component

1335 as described with reference to FIG. 13. The following provides an overview of aspects of the present disclosure:

Aspect 1: A method for wireless communication at a network entity, comprising: transmitting an indication of a beamforming coverage scheme to a controller of a RIS, the beamforming coverage scheme indicating a quantity of beams and a plurality of beam pointing directions for the quantity of beams for a multi-lobe incident beam or for a multi-lobe reflect beam of the RIS for relay of communication between the network entity and one or more UEs; receiving multi-lobe beam information of the RIS, the multi-lobe beam information indicating a realizable multi-lobe beamforming pattern supported by the RIS in accordance with the beamforming coverage scheme; and communicating one or more messages with the one or more UEs via the RIS based at least in part on the beamforming coverage scheme and the multi-lobe beam information.

Aspect 2: The method of aspect 1, further comprising: receiving a control message indicating a single-lobe beamforming codebook supported by the RIS and one or more beams that the RIS is capable of simultaneously creating from the single-lobe beamforming codebook, wherein the indication of the beamforming coverage scheme is transmitted in response to receiving the control message.

Aspect 3: The method of aspect 2, wherein transmitting the indication of the beamforming coverage scheme comprises: transmitting the indication of the beamforming coverage scheme that identifies a plurality of beam indexes from the single-lobe beamforming codebook.

Aspect 4: The method of any of aspects 1 through 3, further comprising: receiving a control message indicating a single-lobe beamforming codebook, a multi-lobe beamforming codebook, and a quasi-colocation correspondence between one or more beams of the single-lobe beamforming codebook and one or more multi-lobe beam patterns of the multi-lobe beamforming codebook, wherein the indication of the beamforming coverage scheme identifies one or more beams from the single-lobe beamforming codebook or one or more multi-lobe beam patterns of the multi-lobe beamforming codebook based at least in part on the control message and the quasi-colocation correspondence.

Aspect 5: The method of any of aspects 1 through 4, wherein transmitting the indication of the beamforming coverage scheme comprises: transmitting the indication comprising an incident signal direction between the network entity and the RIS, a distance between the network entity and the RIS, a range of reflect beam pointing angles associated with the plurality of beam pointing directions, one or more reflect beam pointing angles associated with the one or more UEs, one or more distance ranges associated with the one or more UEs, or any combination thereof.

Aspect 6: The method of any of aspects 1 through 5, wherein receiving the multi-lobe beam information comprises: receiving the multi-lobe beam information indicating one or more attributes of one or more beams associated with the realizable multi-lobe beamforming pattern, the one or more attributes comprising respective pointing angles associated with the one or more beams, respective beamwidths associated with the one or more beams, respective first gain values associated with the one or more beams, a second gain value associated with the one or more beams, reciprocity information associated with the one or more beams, or any combination thereof.

Aspect 7: The method of any of aspects 1 through 6, wherein receiving the multi-lobe beam information comprises: receiving a table indicating one or more multi-lobe beamforming patterns, wherein the one or more multi-lobe beamforming patterns comprise at least the realizable multi-lobe beamforming pattern; and transmitting a request to use the realizable multi-lobe beamforming pattern, wherein communicating the one or more messages is based at least in part on transmitting the request.

Aspect 8: The method of aspect 1, further comprising: receiving single-lobe beam information of the RIS based at least in part on transmitting the indication, the single-lobe beam information indicating one or more realizable single-lobe beamforming patterns supported by the RIS; and transmitting an indication of a plurality of vectors for generating one or more multi-lobe beamforming patterns, wherein receiving the multi-lobe beam information is based at least in part on transmitting the plurality of vectors.

Aspect 9: The method of aspect 8, further comprising: receiving capability information of the RIS, the capability information indicating a reflection coefficient alphabet associated with the RIS, element control information for the RIS, or both; and transmitting an indication of one or more combining coefficients for combining two or more of the plurality of vectors in accordance with the reflection coefficient alphabet.

Aspect 10: The method of aspect 9, wherein the reflection coefficient alphabet is a binary alphabet or a quaternary alphabet.

Aspect 11: The method of any of aspects 8 through 10, wherein transmitting the one or more vectors comprises: transmitting an indication of one or more first vectors identifying a first priority associated with respective realizable single-lobe beamforming patterns of the one or more realizable single-lobe beamforming patterns; receiving first multi-lobe beamforming information of the RIS based at least in part on the one or more first vectors; transmitting an indication of one or more second vectors identifying a second priority associated with the respective realizable single-lobe beamforming patterns based at least in part on the first multi-lobe beamforming information failing to satisfy one or more conditions; and receiving second multi-lobe beamforming information of the RIS based at least in part on the one or more second vectors.

Aspect 12: The method of any of aspects 1 through 11, wherein each beam associated with the multi-lobe incident beam or the multi-lobe reflect beam is associated with at least one UE of the one or more UEs.

Aspect 13: A method for wireless communications at a RIS, comprising: receiving, from a network entity by a controller of the RIS, an indication of a beamforming coverage scheme, the beamforming coverage scheme indicating a quantity of beams and a plurality of beam pointing directions for the quantity of beams for a multi-lobe incident beam or for a multi-lobe reflect beam of the RIS for relay of communication between the network entity and one or more UEs; transmitting multi-lobe beam information of the RIS, the multi-lobe beam information indicating a realizable multi-lobe beamforming pattern supported by the RIS in accordance with the beamforming coverage scheme; and relaying one or more messages between the network entity and the one or more UEs via the multi-lobe incident beam or via the multi-lobe reflect beam based at least in part on the beamforming coverage scheme and the multi-lobe beam information.

Aspect 14: The method of aspect 13, further comprising: transmitting a control message indicating a single-lobe beamforming codebook supported by the RIS and one or more beams that the RIS is capable of simultaneously creating from the single-lobe beamforming codebook, wherein the indication of the beamforming coverage scheme is received in response to transmitting the control message.

Aspect 15: The method of aspect 14, wherein receiving the indication of the beamforming coverage scheme comprises: receiving the indication of the beamforming coverage scheme that identifies a plurality of beam indexes from the single-lobe beamforming codebook.

Aspect 16: The method of any of aspects 13 through 15, further comprising: transmitting a control message indicating a single-lobe beamforming codebook, a multi-lobe beamforming codebook, and a quasi-colocation correspondence between one or more beams of the single-lobe beamforming codebook and one or more multi-lobe beam patterns of the multi-lobe beamforming codebook, wherein the indication of the beamforming coverage scheme identifies one or more beams from the single-lobe beamforming codebook or one or more multi-lobe beam patterns of the multi-lobe beamforming codebook based at least in part on the control message and the quasi-colocation correspondence.

Aspect 17: The method of any of aspects 13 through 16, wherein receiving the indication of the beamforming coverage scheme comprises: receiving the indication comprising an incident signal direction between the network entity and the RIS, a distance between the network entity and the RIS, a range of reflect beam pointing angles associated with the plurality of beam pointing directions, one or more reflect beam pointing angles associated with the one or more UEs, one or more distance ranges associated with the one or more UEs, or any combination thereof.

Aspect 18: The method of any of aspects 13 through 17, wherein transmitting the multi-lobe beam information comprises: transmitting the multi-lobe beam information indicating one or more attributes of one or more beams associated with the realizable multi-lobe beamforming pattern, the one or more attributes comprising respective pointing angles associated with the one or more beams, respective beamwidths associated with the one or more beams, respective first gain values associated with the one or more beams, a second gain value associated with the one or more beams, reciprocity information associated with the one or more beams, or any combination thereof.

Aspect 19: The method of any of aspects 13 through 18, wherein transmitting the multi-lobe beam information comprises: transmitting a table indicating one or more multi-lobe beamforming patterns, wherein the one or more multi-lobe beamforming patterns comprise at least the realizable multi-lobe beamforming pattern; and receiving a request to use the realizable multi-lobe beamforming pattern, wherein relaying the one or more messages is based at least in part on transmitting the request.

Aspect 20: The method of aspect 13, further comprising: transmitting single-lobe beam information of the RIS based at least in part on receiving the indication, the single-lobe beam information indicating one or more realizable single-lobe beamforming patterns supported by the RIS; and receiving an indication of a plurality of vectors for generating one or more multi-lobe beamforming patterns, wherein transmitting the multi-lobe beam information is based at least in part on receiving the plurality of vectors.

Aspect 21: The method of aspect 20, further comprising: transmitting capability information of the RIS, the capability information indicating a reflection coefficient alphabet associated with the RIS, element control information for the RIS, or both; and receiving an indication of one or more combining coefficients for combining two or more of the plurality of vectors in accordance with the reflection coefficient alphabet.

Aspect 22: The method of aspect 21, wherein the reflection coefficient alphabet is a binary alphabet or a quaternary alphabet.

Aspect 23: The method of any of aspects 20 through 22, wherein receiving the indication of the plurality of vectors comprises: receiving an indication of one or more first vectors identifying a first priority associated with respective realizable single-lobe beamforming patterns of the one or more realizable single-lobe beamforming patterns; transmitting first multi-lobe beamforming information of the RIS based at least in part on the one or more first vectors; receiving an indication of one or more second vectors identifying a second priority associated with the respective realizable single-lobe beamforming patterns based at least in part on the first multi-lobe beamforming information failing to satisfy one or more conditions; and transmitting second multi-lobe beamforming information of the RIS based at least in part on the one or more second vectors.

Aspect 24: The method of any of aspects 13 through 23, wherein each beam associated with the multi-lobe incident beam or the multi-lobe reflect beam is associated with at least one UE of the one or more UEs.

Aspect 25: An apparatus for wireless communication at a network entity, comprising a processor; memory coupled with the processor; and instructions stored in the memory and executable by the processor to cause the apparatus to perform a method of any of aspects 1 through 12.

Aspect 26: An apparatus for wireless communication at a network entity, comprising at least one means for performing a method of any of aspects 1 through 12.

Aspect 27: A non-transitory computer-readable medium storing code for wireless communication at a network entity, the code comprising instructions executable by a processor to perform a method of any of aspects 1 through 12.

Aspect 28: An apparatus for wireless communications at a RIS, comprising a processor; memory coupled with the processor; and instructions stored in the memory and executable by the processor to cause the apparatus to perform a method of any of aspects 13 through 24.

Aspect 29: An apparatus for wireless communications at a RIS, comprising at least one means for performing a method of any of aspects 13 through 24.

Aspect 30: A non-transitory computer-readable medium storing code for wireless communications at a RIS, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). In some examples, a processor may be implemented as multiple processors, where each processor of the multiple processors may be operable perform a common set of operations, a respective set of one or more operations, or a combination thereof. For example, to perform a first operation and a second operation, a first processor may be operable perform the first operation and the second processor may be operable to perform the second operation, or the first processor may be operable to perform either of the first operation or the second operation and the second processor may be operable to perform either of the first operation or the second operation.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity for wireless communication, comprising:
   one or more processors;
   one or more memories coupled with the one or more processors; and
   instructions stored in the one or more memories and executable by the one or more processors to cause the network entity to:
      transmit an indication of a beamforming coverage scheme to a controller of a reconfigurable intelligent surface, the beamforming coverage scheme indicating a quantity of beams and a plurality of beam pointing directions for the quantity of beams for a multi-lobe incident beam or for a multi-lobe reflect beam of the reconfigurable intelligent surface for relay of communication between the network entity and one or more user equipments (UEs);
      receive, in response to transmission of the indication of the beamforming coverage scheme, multi-lobe beam information of the reconfigurable intelligent surface, the multi-lobe beam information indicating a realizable multi-lobe beamforming pattern supported by the reconfigurable intelligent surface in accordance with the beamforming coverage scheme; and
      communicate one or more messages with the one or more UEs via the reconfigurable intelligent surface based at least in part on the beamforming coverage scheme and the multi-lobe beam information.

2. The network entity of claim 1, the instructions are further executable by the one or more processors to cause the network entity to:
   receive a control message indicating a single-lobe beamforming codebook supported by the reconfigurable intelligent surface and indicating one or more beams that the reconfigurable intelligent surface is capable of simultaneously creating from the single-lobe beamforming codebook, wherein the indication of the beamforming coverage scheme is transmitted in response to receiving the control message.

3. The network entity of claim 2, wherein, to transmit the indication of the beamforming coverage scheme, the instructions are executable by the one or more processors to cause the network entity to:
   transmit the indication of the beamforming coverage scheme that identifies a plurality of beam indexes from the single-lobe beamforming codebook.

4. The apparatus network entity of claim 1, wherein the instructions are further executable by the one or more processors to cause the network entity to:
   receive a control message indicating a single-lobe beamforming codebook, a multi-lobe beamforming codebook, and a quasi-colocation correspondence between one or more beams of the single-lobe beamforming codebook and one or more multi-lobe beam patterns of the multi-lobe beamforming codebook, wherein the indication of the beamforming coverage scheme identifies one or more beams from the single-lobe beamforming codebook or one or more multi-lobe beam patterns of the multi-lobe beamforming codebook based at least in part on the control message and the quasi-colocation correspondence.

5. The network entity of claim 1, wherein, to transmit the indication of the beamforming coverage scheme, the instructions are executable by the one or more processors to cause the network entity to:

transmit the indication of the beamforming coverage scheme comprising an indication of an incident signal direction between the network entity and the reconfigurable intelligent surface, a distance between the network entity and the reconfigurable intelligent surface, a range of reflect beam pointing angles associated with the plurality of beam pointing directions, one or more reflect beam pointing angles associated with the one or more UEs, one or more distance ranges associated with the one or more UEs, or any combination thereof.

6. The network entity of claim 1, wherein, to receive the multi-lobe beam information, the instructions are executable by the one or more processors to cause the network entity to:

receive the multi-lobe beam information indicating one or more attributes of one or more beams associated with the realizable multi-lobe beamforming pattern, the one or more attributes comprising respective pointing angles associated with the one or more beams, respective beamwidths associated with the one or more beams, respective first gain values associated with the one or more beams, a second gain value associated with the one or more beams, reciprocity information associated with the one or more beams, or any combination thereof.

7. The network entity of claim 1, wherein, to receive the multi-lobe beam information, the instructions are executable by the one or more processors to cause the network entity to:

receive an indication of a table indicating one or more multi-lobe beamforming patterns, wherein the one or more multi-lobe beamforming patterns comprise at least the realizable multi-lobe beamforming pattern, wherein the instructions are further executable by the one or more processors to cause the network entity to:

transmit a request to use the realizable multi-lobe beamforming pattern, wherein communicating the one or more messages is based at least in part on transmitting the request.

8. The network entity of claim 1, wherein the instructions are further executable by the one or more processors to cause the network entity to:

receive single-lobe beam information of the reconfigurable intelligent surface based at least in part on transmitting the indication, the single-lobe beam information indicating one or more realizable single-lobe beamforming patterns supported by the reconfigurable intelligent surface; and transmit an indication of a plurality of vectors for generating one or more multi-lobe beamforming patterns, wherein receiving the multi-lobe beam information is based at least in part on transmitting the plurality of vectors.

9. The network entity of claim 8, wherein the instructions are further executable by the one or more processors to cause the network entity to:

receive capability information of the reconfigurable intelligent surface, the capability information indicating a reflection coefficient alphabet associated with the reconfigurable intelligent surface, element control information for the reconfigurable intelligent surface, or both; and transmit an indication of one or more combining coefficients for combining two or more of the plurality of vectors in accordance with the reflection coefficient alphabet.

10. The network entity of claim 9, wherein the reflection coefficient alphabet is a binary alphabet or a quaternary alphabet.

11. The network entity of claim 8, wherein, to transmit the indication of the plurality of vectors, the instructions are executable by the one or more processors to cause the network entity to:

transmit an indication of one or more first vectors identifying a first priority associated with respective realizable single-lobe beamforming patterns of the one or more realizable single-lobe beamforming patterns, wherein the instructions are further executable by the one or more processors to cause the network entity to:

receive first multi-lobe beamforming information of the reconfigurable intelligent surface based at least in part on the one or more first vectors;

transmit an indication of one or more second vectors identifying a second priority associated with the respective realizable single-lobe beamforming patterns based at least in part on the first multi-lobe beamforming information failing to satisfy one or more conditions; and receive second multi-lobe beamforming information of the reconfigurable intelligent surface based at least in part on the one or more second vectors.

12. The network entity of claim 1, wherein each beam associated with the multi-lobe incident beam or the multi-lobe reflect beam is associated with at least one UE of the one or more UEs.

13. An apparatus for wireless communications at a reconfigurable intelligent surface, comprising:

one or more processors;

one or more memories coupled with the one or more processors; and instructions stored in the one or more memories and executable by the one or more processors to cause the apparatus to:

receive, from a network entity by a controller of the reconfigurable intelligent surface, an indication of a beamforming coverage scheme, the beamforming coverage scheme indicating a quantity of beams and a plurality of beam pointing directions for the quantity of beams for a multi-lobe incident beam or for a multi-lobe reflect beam of the reconfigurable intelligent surface for relay of communication between the network entity and one or more user equipments (UEs);

transmit, in response to reception of the indication of the beamforming coverage scheme, multi-lobe beam information of the reconfigurable intelligent surface, the multi-lobe beam information indicating a realizable multi-lobe beamforming pattern supported by the reconfigurable intelligent surface in accordance with the beamforming coverage scheme; and relay one or more messages between the network entity and the one or more UEs via the multi-lobe incident beam or via the multi-lobe reflect beam based at least in part on the beamforming coverage scheme and the multi-lobe beam information.

14. The apparatus of claim 13, wherein the instructions are further executable by the one or more processors to cause the apparatus to:

transmit a control message indicating a single-lobe beamforming codebook supported by the reconfigurable intelligent surface and one or more beams that the reconfigurable intelligent surface is capable of simultaneously creating from the single-lobe beamforming codebook, wherein the indication of the beamforming coverage scheme is received in response to transmitting the control message.

15. The apparatus of claim 14, wherein, to receive the indication of the beamforming coverage scheme, the instructions are executable by the one or more processors to cause the apparatus to:

receive the indication of the beamforming coverage scheme that identifies a plurality of beam indexes from the single-lobe beamforming codebook.

16. The apparatus of claim 13, wherein the instructions are further executable by the one or more processors to cause the apparatus to:

transmit a control message indicating a single-lobe beamforming codebook, a multi-lobe beamforming codebook, and a quasi-colocation correspondence between one or more beams of the single-lobe beamforming codebook and one or more multi-lobe beam patterns of the multi-lobe beamforming codebook, wherein the indication of the beamforming coverage scheme identifies one or more beams from the single-lobe beamforming codebook or one or more multi-lobe beam patterns of the multi-lobe beamforming codebook based at least in part on the control message and the quasi-colocation correspondence.

17. The apparatus of claim 13, wherein, to receive the indication of the beamforming coverage scheme, the instructions are executable by the one or more processors to cause the apparatus to:

receive the indication comprising an incident signal direction between the network entity and the reconfigurable intelligent surface, a distance between the network entity and the reconfigurable intelligent surface, a range of reflect beam pointing angles associated with the plurality of beam pointing directions, one or more reflect beam pointing angles associated with the one or more UEs, one or more distance ranges associated with the one or more UEs, or any combination thereof.

18. The apparatus of claim 13, wherein, to transmit the multi-lobe beam information, the instructions are executable by the one or more processors to cause the apparatus to:

transmit the multi-lobe beam information indicating one or more attributes of one or more beams associated with the realizable multi-lobe beamforming pattern, the one or more attributes comprising respective pointing angles associated with the one or more beams, respective beamwidths associated with the one or more beams, respective first gain values associated with the one or more beams, a second gain value associated with the one or more beams, reciprocity information associated with the one or more beams, or any combination thereof.

19. The apparatus of claim 13, wherein, to transmit the multi-lobe beam information, the instructions are executable by the one or more processors to cause the apparatus to:

transmit an indication of a table indicating one or more multi-lobe beamforming patterns, wherein the one or more multi-lobe beamforming patterns comprise at least the realizable multi-lobe beamforming pattern, wherein the instructions are further executable by the one or more processors to cause the apparatus to:

receive a request to use the realizable multi-lobe beamforming pattern, wherein relaying the one or more messages is based at least in part on transmitting the request.

20. The apparatus of claim 13 wherein the instructions are further executable by the one or more processors to cause the apparatus to:

transmit single-lobe beam information of the reconfigurable intelligent surface based at least in part on receiving the indication, the single-lobe beam information indicating one or more realizable single-lobe beamforming patterns supported by the reconfigurable intelligent surface; and receive an indication of a plurality of vectors for generating one or more multi-lobe beamforming patterns, wherein transmitting the multi-lobe beam information is based at least in part on receiving the plurality of vectors.

21. The apparatus of claim 20, wherein the instructions are further executable by the one or more processors to cause the apparatus to:

transmit capability information of the reconfigurable intelligent surface, the capability information indicating a reflection coefficient alphabet associated with the reconfigurable intelligent surface, element control information for the reconfigurable intelligent surface, or both; and receive an indication of one or more combining coefficients for combining two or more of the plurality of vectors in accordance with the reflection coefficient alphabet.

22. The apparatus of claim 21, wherein the reflection coefficient alphabet is a binary alphabet or a quaternary alphabet.

23. The apparatus of claim 20, wherein, to receive the indication of the plurality of vectors, the instructions are executable by the one or more processors to cause the apparatus to:

receive an indication of one or more first vectors identifying a first priority associated with respective realizable single-lobe beamforming patterns of the one or more realizable single-lobe beamforming patterns, wherein the instructions are further executable by the one or more processors to cause the apparatus to:

transmit first multi-lobe beamforming information of the reconfigurable intelligent surface based at least in part on the one or more first vectors;

receive an indication of one or more second vectors identifying a second priority associated with the respective realizable single-lobe beamforming patterns based at least in part on the first multi-lobe beamforming information failing to satisfy one or more conditions; and transmit second multi-lobe beamforming information of the reconfigurable intelligent surface based at least in part on the one or more second vectors.

24. The apparatus of claim 13, wherein each beam associated with the multi-lobe incident beam or the multi-lobe reflect beam is associated with at least one UE of the one or more UEs.

25. A method for wireless communication at a network entity, comprising:

transmitting an indication of a beamforming coverage scheme to a controller of a reconfigurable intelligent surface, the beamforming coverage scheme indicating a quantity of beams and a plurality of beam pointing directions for the quantity of beams for a multi-lobe incident beam or for a multi-lobe reflect beam of the reconfigurable intelligent surface for relay of communication between the network entity and one or more user equipments (UEs);

receiving, in response to transmission of the indication of the beamforming coverage scheme, multi-lobe beam information of the reconfigurable intelligent surface, the multi-lobe beam information indicating a realizable multi-lobe beamforming pattern supported by the reconfigurable intelligent surface in accordance with the beamforming coverage scheme; and communicating one or more messages with the one or more UEs via the reconfigurable intelligent surface based at least in part on the beamforming coverage scheme and the multi-lobe beam information.

26. The method of claim 25, further comprising:

receiving a control message indicating a single-lobe beamforming codebook supported by the reconfigurable intelligent surface and indicating one or more beams that the reconfigurable intelligent surface is capable of simultaneously creating from the single-lobe beamforming codebook, wherein the indication of the beamforming coverage scheme is transmitted in response to receiving the control message.

27. The method of claim 26, wherein transmitting the indication of the beamforming coverage scheme comprises:

transmitting the indication of the beamforming coverage scheme that identifies a plurality of beam indexes from the single-lobe beamforming codebook.

28. The method of claim 25, further comprising:

receiving a control message indicating a single-lobe beamforming codebook, a multi-lobe beamforming codebook, and a quasi-colocation correspondence between one or more beams of the single-lobe beamforming codebook and one or more multi-lobe beam patterns of the multi-lobe beamforming codebook, wherein the indication of the beamforming coverage scheme identifies one or more beams from the single-lobe beamforming codebook or one or more multi-lobe beam patterns of the multi-lobe beamforming codebook based at least in part on the control message and the quasi-colocation correspondence.

29. The method of claim 25, wherein transmitting the indication of the beamforming coverage scheme comprises:

transmitting the indication comprising an incident signal direction between the network entity and the reconfigurable intelligent surface, a distance between the network entity and the reconfigurable intelligent surface, a range of reflect beam pointing angles associated with the plurality of beam pointing directions, one or more reflect beam pointing angles associated with the one or more UEs, one or more distance ranges associated with the one or more UEs, or any combination thereof.

30. A method for wireless communications at a reconfigurable intelligent surface, comprising:

receiving, from a network entity by a controller of the reconfigurable intelligent surface, an indication of a beamforming coverage scheme, the beamforming coverage scheme indicating a quantity of beams and a plurality of beam pointing directions for the quantity of beams for a multi-lobe incident beam or for a multi-lobe reflect beam of the reconfigurable intelligent surface for relay of communication between the network entity and one or more user equipments (UEs);

transmitting, in response to reception of the indication of the beamforming coverage scheme, multi-lobe beam information of the reconfigurable intelligent surface, the multi-lobe beam information indicating a realizable multi-lobe beamforming pattern supported by the reconfigurable intelligent surface in accordance with the beamforming coverage scheme; and relaying one or more messages between the network entity and the one or more UEs via the multi-lobe incident beam or via the multi-lobe reflect beam based at least in part on the beamforming coverage scheme and the multi-lobe beam information.

* * * * *